US012626332B2

(12) United States Patent
Shi et al.

(10) Patent No.: US 12,626,332 B2
(45) Date of Patent: May 12, 2026

(54) PROJECTION DATA PROCESSING METHOD AND APPARATUS

(71) Applicant: HUAWEI TECHNOLOGIES CO., LTD., Shenzhen (CN)

(72) Inventors: Xindong Shi, Hangzhou (CN); Jun Li, Hangzhou (CN); Shu Wang, Hangzhou (CN); Jiangzheng Wu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 659 days.

(21) Appl. No.: 18/157,980

(22) Filed: Jan. 23, 2023

(65) Prior Publication Data

US 2023/0162324 A1 May 25, 2023

Related U.S. Application Data

(63) Continuation of application No. PCT/CN2021/094510, filed on May 19, 2021.

(30) Foreign Application Priority Data

Jul. 30, 2020 (CN) .......................... 202010753147.3

(51) Int. Cl.
*G06T 3/4053* (2024.01)
*H04N 5/74* (2006.01)

(52) U.S. Cl.
CPC .............. *G06T 3/4053* (2013.01); *H04N 5/74* (2013.01)

(58) Field of Classification Search
CPC ...... G06T 3/4053; H04N 5/74; H04N 9/3179; H04N 21/4122; H04N 21/440263;
(Continued)

(56) References Cited

U.S. PATENT DOCUMENTS

2014/0096164 A1 4/2014 Bei et al.
2016/0111039 A1 4/2016 Iwami et al.
(Continued)

FOREIGN PATENT DOCUMENTS

CN 104360794 A 2/2015
CN 105025316 A 11/2015
(Continued)

OTHER PUBLICATIONS

Sneha Tipugade et al., "Adaptive Multimedia Streaming between Heterogeneous Users using D2D and Dynamic Wi-Fi Configuration",Mar. 5, 2018, total 5 pages.

*Primary Examiner* — Pegeman Karimi
(74) *Attorney, Agent, or Firm* — WOMBLE BOND DICKINSON (US) LLP

(57) ABSTRACT

Embodiments of this application disclose a projection data processing method, to reduce a delay in a wireless projection process. In the embodiments of this application, the method includes: A projection transmit end obtains network status information, and determines a target resolution of an image to be projected based on the network status information; and then determines a to-be-synthesized layer based on whether the image is in a full-screen scenario. Therefore, an amount of data to be sent during projection can be reduced, and a projection delay can be reduced. In addition, a projection receive end can perform super-resolution on the image, to avoid image quality damage caused by reducing the amount of data sent by the transmit end. This solution reduces the projection delay and ensures projection image quality to improve user experience.

20 Claims, 12 Drawing Sheets

(58) Field of Classification Search
    CPC ..... H04N 21/440281; H04N 21/44227; H04N
                21/4438; H04N 21/4621; G09G 2340/14;
                          G09G 2370/16; G06F 3/1454
    See application file for complete search history.

(56)                    References Cited

U.S. PATENT DOCUMENTS

| | | | |
|---|---|---|---|
| 2016/0189679 A1* | 6/2016 | Lomotan | G06F 3/1423 |
| | | | 345/156 |
| 2018/0234978 A1* | 8/2018 | Shao | H04W 72/541 |
| 2019/0349382 A1* | 11/2019 | Thomas | H04N 21/6334 |

FOREIGN PATENT DOCUMENTS

| | | | |
|---|---|---|---|
| CN | 106155606 A | 11/2016 |
| CN | 106899620 A | 6/2017 |
| CN | 108446085 A | 8/2018 |
| CN | 108900894 A | 11/2018 |
| CN | 110134356 A | 8/2019 |
| CN | 110392047 A | 10/2019 |
| CN | 110908627 A | 3/2020 |
| CN | 111580765 A | 8/2020 |
| CN | 111626931 A | 9/2020 |
| CN | 112346692 A | 2/2021 |
| CN | 112492395 A | 3/2021 |
| JP | 2017028705 A | 2/2017 |
| JP | 2018503281 A | 2/2018 |
| JP | 2019121836 A | 7/2019 |
| JP | 2019176374 A | 10/2019 |

* cited by examiner

Perception module

PROJECTION DATA PROCESSING METHOD AND APPARATUS

CROSS-REFERENCE TO RELATED APPLICATIONS

This application is a continuation of International Application No. PCT/CN2021/094510, filed on May 19, 2021, which claims priority to Chinese Patent Application No. 202010753147.3, filed on Jul. 30, 2020. The disclosures of the aforementioned applications are hereby incorporated by reference in their entireties.

TECHNICAL FIELD

This application relates to the field of projection technologies, and in particular, to a projection data processing method and apparatus.

BACKGROUND

In recent years, with rapid development of intelligent terminals, a mobile phone, a tablet computer, a computer, a projector, and a smart television are continuously iteratively upgraded. A wireless projection technology makes interaction between a plurality of screens, and corresponding application scenarios also become more diversified and popular. Against this background, seamless transfer of mobile-centric streaming media resources between devices is becoming a rigid demand.

Wireless projection is a mode of interaction between a plurality of screens in the past one or two years. Common scenarios include screen mirroring, game projection, and multi-screen interaction. Mainstream wireless projection protocols include digital living network alliance (DLNA), Apple's airplay (Airplay), and Wi-Fi alliance-specified wireless display standard (Miracast).

Currently, a delay of the three mainstream wireless projection modes is about 100 ms to 2000 ms, which is long and cannot meet a requirement of direct wireless projection in a game application. As a result, user experience is poor.

SUMMARY

Embodiments of this application provide a projection data processing method, to reduce a projection delay and improve user experience.

A first aspect of an embodiment of the application provides a projection data processing method, including: A terminal obtains network status information, where the network status information indicates quality of a communication link between the terminal and a projection device; the terminal determines a target resolution of a to-be-projected image based on the network status information; and the terminal synthesizes image data based on the target resolution, and sends the image data to the projection device, where the image data is used by the projection device to display the to-be-projected image.

The to-be-projected image may be understood as a static image, for example, a picture, or may be understood as a series of dynamic images, for example, a video.

According to the projection data processing method provided in an embodiment of the application, the terminal determines the target resolution of the to-be-projected image by obtaining the network status information that indicates the quality of the communication link between the terminal and the projection device, and adjusts the target resolution based on real-time network status information. Compared with the conventional technology in which an image is sent at a fixed resolution, this method can be more flexibly adapted to a current scenario. In this method, the target resolution is determined by considering the network status information, and an amount of image data can be reduced by adjusting the resolution when wireless network communication quality is poor, thereby reducing a video image delay during projection, and improving user experience.

In an embodiment of the first aspect, the target resolution is positively correlated with the quality of the communication link.

According to the projection data processing method provided in an embodiment of the application, for example, when the quality of the communication link is poor, an image is sent at a low resolution to reduce a delay, and when the quality of the communication link is good, an image is sent at a high resolution to improve projection image quality.

In an embodiment of the first aspect, the network status information includes a received signal strength indicator RSSI.

According to the projection data processing method provided in an embodiment of the application, the quality of the communication link may be measured by using an RSSI signal, including a wireless communication link established based on a Wi-Fi protocol, a wireless communication link established based on a cellular mobile network protocol, or the like. In an embodiment, a correspondence between a value of the RSSI and the target resolution is preset. Therefore, a target in a current network status may be determined based on the RSSI signal.

In an embodiment of the first aspect, that the terminal determines a target resolution of a to-be-projected image based on the network status information includes: if a value of the RSSI is greater than or equal to a first threshold, the terminal determines that the target resolution is a first resolution; if a value of the RSSI is less than a first threshold and is greater than or equal to a second threshold, the terminal determines that the target resolution is half of a first resolution, where the second threshold is less than the first threshold; or if the value of the RSSI is less than a second threshold, the terminal determines that the target resolution is one-third of a first resolution.

According to the projection data processing method provided in an embodiment of the application, the quality of the communication link between the terminal and the projection device may be classified into three cases based on a preset RSSI value range and the first resolution. Lower quality of the communication link indicates corresponding lower target resolution, and smaller data amount of a synthesized to-be-projected image. This can reduce impact on the quality of the communication link and reduce a projection delay.

In an embodiment, the first resolution is a resolution of a to-be-synthesized layer. The information may be obtained by obtaining all layer information of a current frame on a SurfaceFlinger side. The layer information includes an application name of the layer, a source real resolution of the layer, and the like.

In an embodiment of the first aspect, the method further includes: The terminal determines a current usage scenario; and that the terminal synthesizes image data based on the target resolution includes: The terminal selectively synthesizes the image data based on the usage scenario and the target resolution.

According to the projection data processing method provided in an embodiment of the application, the current usage scenario is further considered, and the image data is selectively synthesized based on the scenario and the target resolution, so that an amount of data during wireless projection can be further reduced.

In an embodiment of the first aspect, that the terminal determines a current usage scenario includes: The terminal determines whether the to-be-projected image is in a full-screen scenario; and that the terminal selectively synthesizes the image data based on the usage scenario and the target resolution includes: when the terminal determines that the to-be-projected image is in the full-screen scenario, the terminal synthesizes only an application layer of all layers of the to-be-projected image based on the target resolution; or when the terminal determines that the to-be-projected image is in a non-full-screen scenario, the terminal synthesizes a system layer of the to-be-projected image and an application layer based on the target resolution.

According to the projection data processing method provided in an embodiment of the application, the terminal may further determine whether current image display scenario information is the full-screen display scenario. If the current image display scenario information is the full-screen display scenario, only the application layer needs to be synthesized, encoded, and sent to the projection device. Therefore, an amount of data to be sent for projection can be further reduced, a wireless projection delay can be reduced, and user experience can be improved.

In an embodiment of the first aspect, that the terminal determines whether the to-be-projected image is in a full-screen scenario includes: if a source resolution of the application layer is greater than or equal to a third threshold, the terminal determines that the to-be-projected image is in the full-screen scenario; or if a source resolution of the application layer is less than a third threshold, the terminal determines that the to-be-projected image is in the non-full-screen scenario.

The to-be-projected image displayed by the terminal may have two scenarios. One is a full-screen display scenario, for example, a full-screen game picture and a full-screen picture in a video application. The full-screen display scenario may be referred to as the full-screen scenario. The other is a non-full-screen display scenario, for example, a desktop scenario or a video picture played in a small window, also referred to as the non-full-screen scenario. an embodiment provides a method for determining whether the to-be-projected image is in the full-screen scenario, that is, determining the source resolution of the application layer. Because the source resolution of the application layer changes in a different display scenario, a resolution in the full-screen scenario is higher than a resolution in the non-full-screen scenario. The third threshold is set, and whether the current to-be-projected image is in the full-screen scenario may be simply but roughly determined through comparison.

In an embodiment of the first aspect, that the terminal determines whether the to-be-projected image is in a full-screen scenario includes: if a pixel aspect ratio of the application layer is the same as a pixel aspect ratio of a screen, the terminal determines that the to-be-projected image is in the full-screen scenario; or if a pixel aspect ratio of the application layer is different from a pixel aspect ratio of a screen, the terminal determines that the to-be-projected image is in the non-full-screen scenario.

An embodiment provides another method for determining whether the to-be-projected image is in the full-screen scenario, that is, determining whether the pixel aspect ratio of the application layer is the same as the pixel aspect ratio of the screen. Because the pixel aspect ratio of the application layer usually changes in a different display scenario, in the full-screen scenario, the pixel aspect ratio of the application layer is the same as the pixel aspect ratio of the screen; while in the non-full-screen scenario, the pixel aspect ratio of the application layer may be different from the pixel aspect ratio of the screen. In this solution, whether the current to-be-projected image is in the full-screen scenario may be simply but roughly determined.

In an embodiment of the first aspect, that the terminal determines whether the to-be-projected image is in a full-screen scenario includes: if a source resolution of the application layer is greater than or equal to a third threshold, and a pixel aspect ratio of the application layer is the same as a pixel aspect ratio of a screen, the terminal determines that the to-be-projected image is in the full-screen scenario; or if a source resolution of the application layer is less than a third threshold, or a pixel aspect ratio of the application layer is different from a pixel aspect ratio of a screen, the terminal determines that the to-be-projected image is in the non-full-screen scenario.

An embodiment provides another method for determining whether the to-be-projected image is in the full-screen scenario. In addition, the source resolution of the application layer is considered, and it is determined whether the pixel aspect ratio of the application layer is the same as the pixel aspect ratio of the screen. In some special cases, in the full-screen scenario or the non-full-screen scenario, the pixel aspect ratio of the application layer is the same as the pixel aspect ratio of the screen. Alternatively, when a high-resolution small window is used to play a picture, only the source resolution of the application layer is used for determining, and the non-full-screen scenario may be falsely determined as the full-screen scenario. In this solution, both factors are considered, so that accuracy of scenario determining can be improved.

In an embodiment of the first aspect, that the terminal determines whether the to-be-projected image is in a full-screen scenario includes: if a source resolution of the application layer is greater than or equal to a third threshold, a pixel aspect ratio of the application layer is the same as a pixel aspect ratio of a screen, and a preset layer identifier set includes an identifier of the application layer, the terminal determines that the to-be-projected image is in the full-screen scenario; or if a source resolution of the application layer is less than a third threshold, a pixel aspect ratio of the application layer is different from a pixel aspect ratio of a screen, or a preset layer identifier set does not include an identifier of the application layer, the terminal determines that the to-be-projected image is in the non-full-screen scenario.

An embodiment provides another method for determining whether the to-be-projected image is in the full-screen scenario. In addition, the source resolution of the application layer is considered, whether the pixel aspect ratio of the application layer is the same as the pixel aspect ratio of the screen is determined, and a layer name is determined. In rare special cases, a scenario may still be falsely determined based on the source resolution and the pixel aspect ratio of the application layer. In this solution, a layer name may be further considered. In an embodiment, the terminal presets a layer name whitelist, and a layer corresponding to a layer name in the layer name whitelist is a layer that may be displayed in full screen. In this way, accuracy of scenario determining can be further improved.

In an embodiment of the first aspect, the terminal synthesizes image data based on the target resolution includes: The terminal synthesizes the image data based on the target resolution and a first frame rate, where the first frame rate is lower than a frame rate at which the to-be-projected image is displayed on the terminal.

According to the projection data processing method provided in an embodiment of the application, for dynamic image data of a video type, the terminal may further perform frame reduction processing on the to-be-projected image, to further reduce an amount of data that needs to be sent for projection, thereby reducing a projection delay and improving user experience.

A second aspect of an embodiment of the application provides a projection data processing method, including: A projection device receives a to-be-projected image of a first resolution; the projection device performs super-resolution on the to-be-projected image of the first resolution based on a preset neural network model by using a graphics processing unit GPU, to obtain an image of a second resolution; and the projection device displays the image of the second resolution.

According to the projection data processing method provided in an embodiment of the application, the projection device may perform, by using the GPU, super-resolution on the to-be-projected image of the first resolution sent by the terminal, to improve a resolution of a displayed image. Because the projection device usually has a high display resolution, and is limited by a wireless transmission delay, a resolution of the received to-be-projected image is usually low. Super-resolution processing is performed on the image before the image is played, so that an image display definition can be improved, image quality can be improved, and user experience can be improved.

In an embodiment of the second aspect, the to-be-projected image includes a first image frame; and that the projection device performs super-resolution on the image of the first resolution based on a preset neural network model by using a graphics processing unit GPU, to obtain an image of a second resolution includes: The projection device performs decoding and super-resolution on the first image frame in one audio and video synchronization period, to obtain decoded image data of the second resolution.

Generally, the projection device decodes one frame of image in one audio and video synchronization period, and sends the image for display after a next period arrives. According to the projection data processing method provided in an embodiment of the application, the projection device may complete decoding and super-resolution in one audio and video synchronization period, so that an extra projection delay is not increased due to super-resolution.

In an embodiment of the second aspect, if a first frame rate of the to-be-projected image is less than a fourth threshold, the projection device performs frame interpolation on the to-be-projected image to obtain a to-be-projected image of a second frame rate.

According to the projection data processing method provided in an embodiment of the application, because the terminal reduces a projection delay through frame subtraction, correspondingly, the projection device may increase a frame rate through frame interpolation. If the projection device determines that the frame rate of the to-be-projected image is low, the projection device may perform intelligent frame interpolation to improve playback image quality.

In an embodiment of the second aspect, the to-be-projected image of the first resolution includes the synthesized image data in any one of the first aspect and an embodiment of the application.

According to the projection data processing method provided in an embodiment of the application, the to-beprojected image received by the projection device may be the synthesized image data in any one of the first aspect and an embodiment of the application. In this way, the first resolution is a target resolution, and the projection device can reduce, through super-resolution, an image quality loss caused by resolution reduction of the terminal. Therefore, in the projection process, a low delay can be met, and projection image quality can be ensured, thereby significantly improving user experience.

A third aspect of an embodiment of the application provides a projection data processing apparatus, including: an obtaining unit, configured to obtain network status information, where the network status information indicates quality of a communication link between a terminal and a projection device; a determining unit, configured to determine a target resolution of a to-be-projected image based on the network status information; and a synthesizing unit, configured to synthesize image data based on the target resolution, and send the image data to the projection device, where the image data is used by the projection device to display the to-be-projected image.

In an embodiment of the third aspect, the target resolution is positively correlated with the quality of the communication link.

In an embodiment of the third aspect, the network status information includes a received signal strength indicator RSSI.

In an embodiment of the third aspect, the determining unit is configured to: if a value of the RSSI is greater than or equal to a first threshold, determine that the target resolution is a first resolution; if a value of the RSSI is less than a first threshold and is greater than or equal to a second threshold, determine that the target resolution is half of a first resolution, where the second threshold is less than the first threshold; or if a value of the RSSI is less than a second threshold, determine that the target resolution is one-third of a first resolution.

In an embodiment of the third aspect, the determining unit is further configured to: determine a current usage scenario; and the synthesizing unit is configured to: selectively synthesize the image data based on the usage scenario and the target resolution.

In an embodiment of the third aspect, the determining unit is configured to: determine whether the to-be-projected image is in a full-screen scenario; and the synthesizing unit is configured to: if it is determined that the to-be-projected image is in the full-screen scenario, synthesize only an application layer of all layers of the to-be-projected image based on the target resolution; or if it is determined that the to-be-projected image is in a non-full-screen scenario, synthesize a system layer of the to-be-projected image and an application layer based on the target resolution.

In an embodiment of the third aspect, the determining unit is configured to: if a source resolution of the application layer is greater than or equal to a third threshold, determine that the to-be-projected image is in the full-screen scenario; or if a source resolution of the application layer is less than a third threshold, determine that the to-be-projected image is in the non-full-screen scenario.

In an embodiment of the third aspect, the determining unit is configured to: if a pixel aspect ratio of the application layer is the same as a pixel aspect ratio of a screen, determine that the to-be-projected image is in the full-screen scenario; or if a pixel aspect ratio of the application layer is different from a pixel aspect ratio of a screen, determine that the to-be-projected image is in the non-full-screen scenario.

In an embodiment of the third aspect, the determining unit is configured to: if a source resolution of the application layer is greater than or equal to a third threshold, and a pixel aspect ratio of the application layer is the same as a pixel aspect ratio of the application layer is the same as a pixel aspect ratio of a screen, determine that the to-be-projected image is in the full-screen scenario; or if a source resolution of the application layer is less than a third threshold, or a pixel aspect ratio of the application layer is different from a pixel aspect ratio of a screen, determine that the to-be-projected image is in the non-full-screen scenario.

In an embodiment of the third aspect, the determining unit is configured to: if a source resolution of the application layer is greater than or equal to a third threshold, a pixel aspect ratio of the application layer is the same as a pixel aspect ratio of a screen, and a preset layer identifier set includes an identifier of the application layer, determine that the to-be-projected image is in the full-screen scenario; or if a source resolution of the application layer is less than a third threshold, a pixel aspect ratio of the application layer is different from a pixel aspect ratio of a screen, or a preset layer identifier set does not include an identifier of the application layer, determine that the to-be-projected image is in the non-full-screen scenario.

In an embodiment of the third aspect, the synthesizing unit is configured to: synthesize the image data based on the target resolution and a first frame rate, where the first frame rate is lower than a frame rate at which the to-be-projected image is displayed on the terminal.

A fourth aspect of an embodiment of the application provides a projection data processing apparatus, including: a receiving unit, configured to receive a to-be-projected image of a first resolution; an obtaining unit, configured to perform super-resolution on the to-be-projected image of the first resolution based on a preset neural network model by using a graphics processing unit GPU, to obtain an image of a second resolution; and a display unit, configured to display the image of the second resolution.

In an embodiment of the fourth aspect, the to-be-projected image includes a first image frame; and the obtaining unit is configured to: perform decoding and super-resolution on the first image frame in one audio and video synchronization period, to obtain decoded image data of the second resolution.

In an embodiment of the fourth aspect, the apparatus further includes: a processing unit, configured to: if a first frame rate of the to-be-projected image is less than a fourth threshold, perform frame interpolation on the to-be-projected image to obtain a to-be-projected image of a second frame rate.

In an embodiment of the fourth aspect, the to-be-projected image of the first resolution includes the synthesized image data in the first aspect and various possible implementations.

A fifth aspect of an embodiment of the application provides a projection system, including a transmit end and a receive end, where the transmit end is connected to the receive end through a wireless communication link, the transmit end includes the projection data processing apparatus in any one of the third aspect and an embodiment of the application, and the receive end includes the projection data processing apparatus in any one of the fourth aspect and an embodiment of the application.

According to the projection system provided in an embodiment of the application, the terminal adjusts a target resolution by sensing real-time network status information, and the projection device performs super-resolution on a received to-be-projected image, to reduce an image quality loss caused by resolution reduction of the terminal. Therefore, in a projection process, a low delay can be met, and image quality can be ensured, thereby significantly improving user experience.

A sixth aspect of an embodiment of the application provides a terminal, including one or more processors and a memory. The memory stores computer-readable instructions. The one or more processors read the computer-readable instructions, and the terminal is enabled to perform the method in any one of the first aspect and the possible implementations.

A seventh aspect of an embodiment of the application provides a projection device, including one or more processors and a memory. The memory stores computer readable instructions. The one or more processors read the computer readable instructions, and the terminal is enabled to perform the method in any one of the second aspect and the possible implementations.

An eighth aspect of an embodiment of the application provides a computer program product including instructions. When the computer program product is run on a computer, the computer is enabled to perform the method in any one of the first aspect, the second aspect, and the possible implementations.

A ninth aspect of an embodiment of the application provides a computer-readable storage medium, including instructions. When the instructions are run on a computer, the computer is enabled to perform the method in any one of the first aspect, the second aspect, and the possible implementations.

A tenth aspect of an embodiment of the application provides a chip, including a processor. The processor is configured to read and execute a computer program stored in a memory, to perform the method in any one of the first aspect, the second aspect, and the possible implementations. In an embodiment, the chip includes the memory, and the memory and the processor are connected to the memory by using a circuit or a wire. Further, in an embodiment, the chip further includes a communication interface, and the processor is connected to the communication interface. The communication interface is configured to receive data or information or both that need to be processed. The processor obtains the data and/or the information from the communication interface, processes the data and/or the information, and outputs a processing result through the communication interface. The communication interface may be an input/output interface.

For technical effects brought by any implementation of the third aspect, the fourth aspect, or the sixth aspect to the tenth aspect, refer to technical effects brought by corresponding implementations of the first aspect or the second aspect. Details are not described herein again.

According to the foregoing technical solutions, it can be learned that embodiments of the application have the following advantages:

According to the projection data processing method provided in an embodiment of the application, the terminal obtains the current network status information, determines the target resolution of the to-be-projected image based on the network status information, and may adjust the target resolution based on the real-time network status. When the quality of the communication link between the terminal and the projection device is poor, the target resolution may be reduced to reduce the amount of data that needs to be transmitted during wireless projection, thereby reducing a delay and improving user experience.

In addition, in this method, the terminal may further obtain the source resolution of the application layer in the to-be-projected image and a screen resolution, and determine, based on the source resolution of the application layer and the screen resolution, whether the current to-be-projected scenario is the full-screen scenario. In the full-screen scenario, only the information about the application layer may be displayed, that is, only the image data of the application layer needs to be sent to the projection device; while in the non-full-screen scenario, the image information of the application layer and the system layer needs to be displayed, so that the image data sent by the projection device needs to include the image information of the application layer and the system layer. The terminal determines the to-be-synthesized image layer in the to-be-projected image based on the scenario, determines the synthesized target resolution based on the current network status, and synthesizes, encodes, and sends the to-be-synthesized image layer based on the network status and an actual projection requirement. This can further reduce the amount of data that needs to be transmitted in wireless projection, thereby reducing a delay and improving user experience.

In addition, according to the projection data processing method provided in an embodiment of the application, the projection receive end, that is, the projection device, may perform super-resolution on the received image data of the first resolution, obtain the image data of the second resolution, and display the image data. This can improve the resolution of the displayed image, fully utilize performance of the projection device, improve image quality, and improve user experience.

According to the projection system provided in an embodiment of the application, the terminal senses the current to-be-projected scenario and the network status, to reduce the amount of sent image data, and cooperates with super-resolution processing of the projection device, to ensure projection image quality when the image data is reduced. In the projection system, a projection delay is short and projection image quality is high, thereby significantly improving user experience.

DESCRIPTION OF EMBODIMENTS

Figure 1:
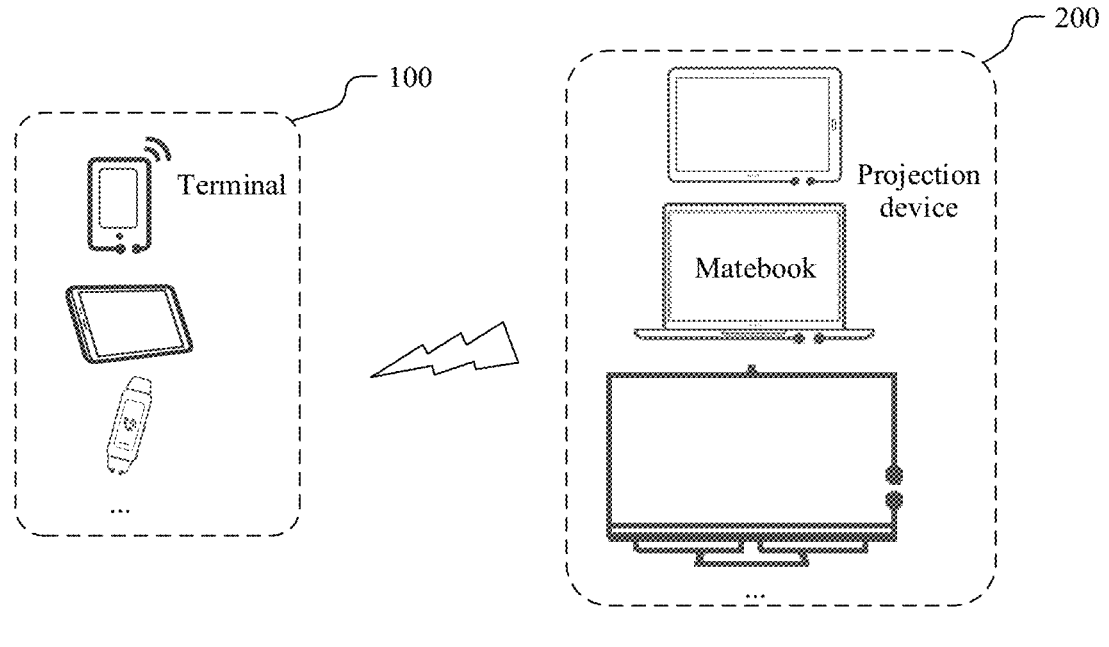
FIG. 1 is a schematic diagram of a wireless projection scenario.

Embodiments of this application provide a projection data processing method, to reduce a projection delay and improve user experience.

For ease of understanding, the following briefly describes some technical terms in embodiments of the application.

1. Wireless Projection

Wireless projection is also called wireless screen sharing, flying screen, or screen sharing. For example, a picture of a device A (such as a mobile phone, a tablet, a notebook computer, or a computer) is "real-time" displayed on a screen of another device B (such as a tablet, a notebook computer, a television, an all-in-one machine, or a projector) by using a wireless transmission technology, and output content includes various media information or a real-time operation picture. Currently, mature solutions that support the wireless projection technology include Apple's Airplay screen mirroring, Miracast protocol of the Wi-Fi Alliance, and DLNA push of another company.

Through wireless projection, conference content, multimedia files, game pictures, movies, and video pictures can be displayed on another screen for interaction without cable connections. A user can get rid of shackles and enjoy a faster and freer projection experience. The wireless projection technology has been closely related to our life, providing more convenience for work and entertainment.

2. Image

The image in an embodiment of the application may be a static image, for example, a picture, or may be a series of dynamic images, for example, a video. "Image", "video frame", and "frame" can be used as synonyms. The image may be obtained by synthesizing a plurality of layers.

3. Layer

When an image is displayed on a display screen of the terminal, the displayed image may be obtained by synthesizing two types of layers. The two types of layers are respectively an application layer and a system layer. The application layer is a main content display layer, and its resolution may be set or determined according to a user's selection of a display window size. The system layer is a user interface layer obtained by locally performing 2D drawing on a terminal application, and generally includes a status bar, a control menu, prompt information, and the like. A resolution of the system layer is generally a system resolution of the terminal.

Generally, when displaying a picture in a non-full-screen scenario, the terminal synthesizes the application layer and the system layer in an online or offline manner, and then displays an image obtained through synthesis. A plurality of layers perform synthesis according to a preset rule to obtain an image of a preset resolution. A synthesis process belongs to the conventional technology, and details are not described herein again. However, in a full-screen display scenario, for example, a full-screen game scenario or a full-screen video playback scenario, the terminal may display only the application layer.

It should be noted that data included in a single layer is image data, and data included in a display picture obtained by synthesizing the plurality of layers is also image data. In an embodiment of the application, for ease of differentiation, the image data used to be displayed in the terminal is referred to as an image, and the image data corresponding to the single layer used to synthesize the image is referred to as a layer. It may be understood that when the displayed image includes only one layer (for example, in a full-screen scenario, only an application layer is displayed), the image and the layer correspond to same image data.

4. Frame Rate

A frequency (rate) at which bitmap images continuously appear on a display in frames. A measurement unit is "frame per second" (FPS) or "Hertz". Generally, FPS is used to describe how many frames are played per second for a film, electronic drawing, or game.

5. Resolution

To avoid confusion, the following describes and distinguishes several terms related to the resolution.

Image resolution: indicates an amount of information stored in an image, that is, a quantity of pixels in an image per inch, and is usually represented by "quantity of horizontal pixels×quantity of vertical pixels" or by specification code. For example, if an image resolution is 640*480, a quantity of horizontal pixels is 640, and a quantity of vertical pixels is 480, a resolution is 307200 pixels, that is, 300,000 pixels. A resolution is 720P. The code P indicates progressive scanning. A resolution corresponding to 720P is 1280*720. Similarly, a resolution corresponding to 1080P is 1920*1080. It may be understood that a higher resolution of an image indicates more data included and richer details can also be presented, but more computer storage resources are required.

Display resolution: refers to a physical resolution of a computer display itself. For a CRT display, it refers to phosphor dots on the screen. For an LCD display, it refers to a pixel on the display. The display resolution is determined during manufacturing of the display. It describes a quantity of pixels of the display itself and is an inherently unchangeable value. The display resolution is usually represented in a format of "quantity of horizontal pixels×quantity of vertical pixels", for example, 800×600, 1024×768, and 1280×1024, or by specification code. The display resolution is of great significance to a display device. For a screen size of a same size, a higher resolution indicates a more delicate screen, that is, details of an image can be presented more clearly, and visual experience of a user can be greatly improved.

Screen resolution: refers to a resolution used by a computer to display an image, and can be set as required. The screen resolution needs to be smaller than or equal to the display resolution.

In addition, the embodiments of the application further use the following terms:

(1) Source resolution of a layer: belongs to an image resolution and indicates an amount of information stored in the layer.

(2) Resolution of a target display area: belongs to a screen resolution and indicates a size of a display area of an image on a screen.

The following describes embodiments of the application with reference to the accompanying drawings. It is clear that the described embodiments are merely some but not all of embodiments of the application. Persons of ordinary skill in the art may learn that, with technology development and emergence of a new scenario, the technical solutions provided in embodiments of the application are also applicable to a similar technical problem.

In the specification, claims, and accompanying drawings of the application, the terms "first", "second", and so on are intended to distinguish between similar objects but do not necessarily indicate an order or sequence. It should be understood that the data termed in such a way are interchangeable in proper circumstances so that embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of operations or modules is not necessarily limited to those operations or modules, but may include other operations or modules not expressly listed or inherent to such a process, method, system, product, or device. Names or numbers of operations in the application do not mean that the operations in the method procedure need to be performed in a time/logical sequence indicated by the names or numbers. An execution sequence of the operations in the procedure that have been named or numbered can be changed based on a technical objective to be achieved, provided that same or similar technical effects can be achieved.

The embodiments of the application are applicable to a plurality of types of wireless projection scenarios, including game projection, a real-time streaming media service, and the like, for example, scenarios such as a live video service, a video call service, and a video conference service. As shown in FIG. 1, the wireless projection scenario includes a terminal 100 and a projection device 200.

The terminal 100 is a data transmit end in a wireless projection scenario, or is referred to as a transmit side. For example, the terminal may be a mobile phone, a notebook computer, or a tablet computer.

The projection device 200, that is, a data receive end in a wireless projection scenario, or referred to as a receive side, has an image display function. The projection device 200 and the terminal 100 are usually located in a same scenario. For example, the projection device 200 and the terminal 100 are located in a same home, or located in a same office, or located in a same activity site, or the like. The projection device 200 may be a computer, a smart television, a smart screen, or the like.

The terminal 100 may project a display picture onto the projection device 200, so that the projection device 200 and the terminal 100 perform synchronous display. The foregoing process in which the terminal projects the display picture to the projection device may also be referred to as "projection", "screen transferring", "one-screen interaction", or the like. Because a size of a display screen of the terminal 100 is usually small, visual experience of a user is poor when the user watches an image or a video picture by using the terminal 100. However, a size of a display screen of the projection device 200 is usually large, or a size of a display apparatus is large. Therefore, a display picture of the terminal 100 is projected onto the projection device 200, and a user watches the display picture by using the projection device 200, so that visual experience of the user can be improved.

The terminal 100 communicates with the projection device 200 by using a wireless network. The wireless network includes a network established according to one protocol or a combination of a plurality of protocols of the Wireless Fidelity protocol, the Bluetooth protocol, or the cellular mobile network protocol. In an embodiment, the terminal sends image data to the projection device by using Wi-Fi. In an embodiment, the terminal sends image data to the projection device by using 5G.

Generally, a delay range of wireless data transmission between the terminal 100 and the projection device 200 is about 100 milliseconds (ms) to 2000 ms, and a delay is loose. In a scenario with a high real-time requirement, for example, a game projection scenario, user experience is poor. The projection delay is related to an amount of the transmitted image data. If the data amount is reduced by simply reducing a resolution of the image data, image quality is affected, a projected image is blurred, and user experience is affected.

In an embodiment of the application, in one aspect, considering a real-time network status of a wireless network during wireless projection, when quality of a wireless network communication link is high, synthesis, encoding, and transmission may be performed based on a source resolution of a to-be-synthesized image layer; and when quality of a communication link is poor, a resolution of each to-be-synthesized image layer may be properly reduced. In another aspect, considering an application scenario in which the terminal displays an image, in a full-screen display scenario, for example, a full-screen game scenario or a full-screen video playback scenario, only an application layer may be displayed, and a system layer is hidden. Therefore, in the full-screen display scenario, the terminal may send only image data of the application layer to the projection device. In anon-full-screen display scenario, for example, in a desktop display scenario, the application layer and the system layer need to be synthesized and then displayed. Therefore, in the non-full-screen display scenario, the terminal needs to send image data of all layers to the projection device.

According to the projection data processing method provided in the application, a to-be-synthesized image layer and a target resolution in the image data are determined based on layer information and network status information. In a full-screen scenario, a quantity of sent layers is reduced, and a resolution is reduced when the quality of the communication link is poor, to reduce an amount of image data sent during wireless projection, thereby avoiding a video image delay during projection and improving user experience.

In addition, in a current wireless projection technology, the transmit end may uniform a resolution of a to-be-projected image to 720P or 1080P and sends the to-be-projected image to the projection device. However, the projection device usually supports a higher resolution, for example, 2K/4K/8K. After receiving a wireless projection data frame, the projection device linearly stretches the data frame to a resolution supported by a television, resulting in blurring. In addition, in some scenarios, an actual resolution of a layer of the transmit end is lower than 720P or 1080P, and the transmit end uniformly stretches and zooms in the layer before sending, which affects image quality and increases a load of encoding, decoding, and transmission.

According to the projection data processing method provided in the application, the projection device performs super-resolution on the image sent by the terminal, to improve the resolution and to improve image quality for display. This can reduce image quality deterioration caused by image resolution reduction at the transmit end when the network status is poor. Therefore, the projection delay can be short and image quality can be good, thereby significantly improving user experience.

Figure 2:
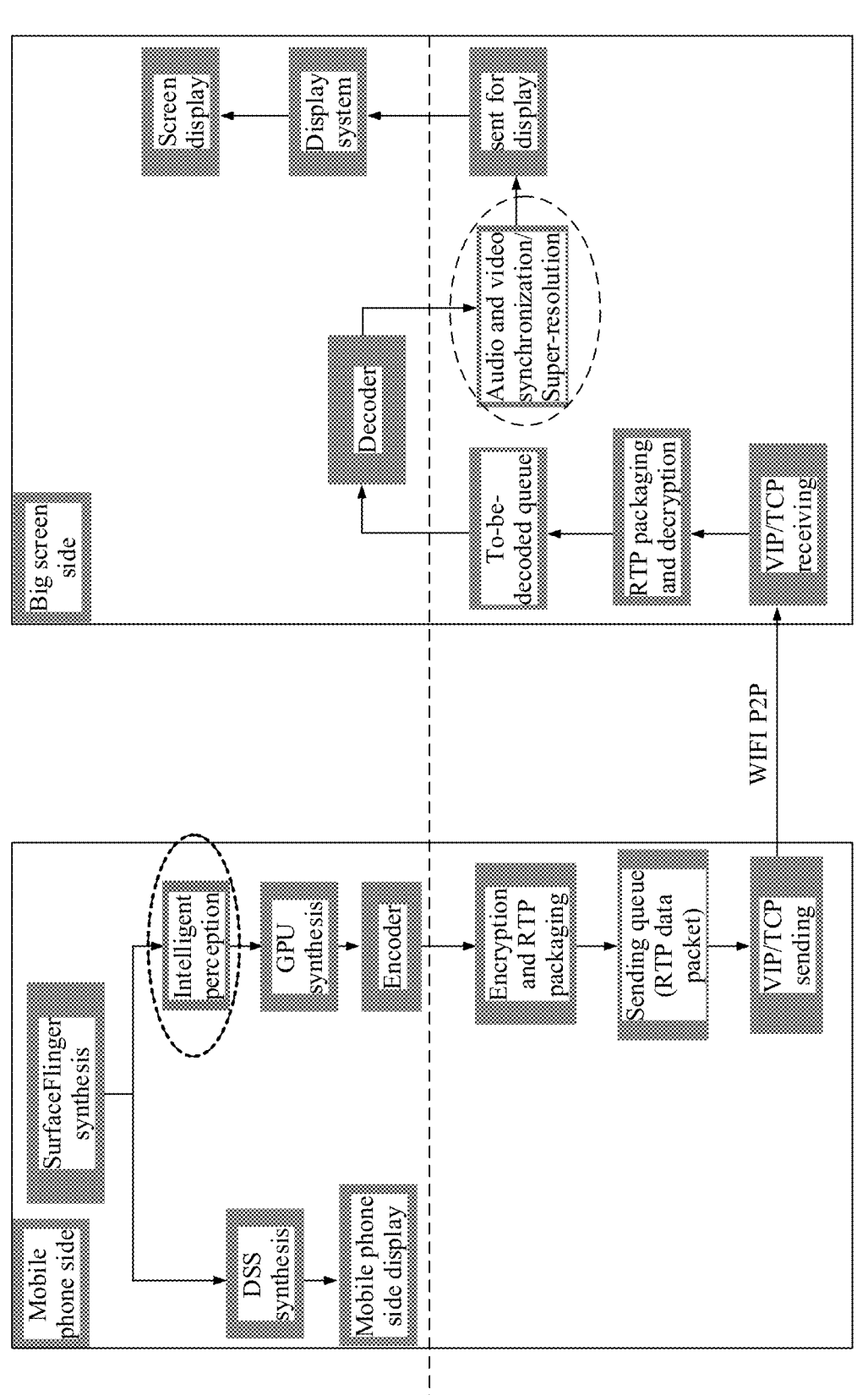
FIG. 2 is a schematic diagram of a technical framework of wireless projection according to an embodiment of the application.

The following briefly describes a projection technology. FIG. 2 is a schematic diagram of a technical framework of wireless projection according to an embodiment of the application.

The transmit side is, for example, a mobile phone, a synthesizer service (the following uses the SurfaeFlinger service in the Android system as an example). The Surfae-Flinger service may obtain each layer of a to-be-displayed image, including image data and layer information. In one aspect, an image is synthesized by a display subsystem (DSS), and the obtained image is displayed on a display screen of the mobile phone. In another aspect, image data synthesized at each layer is sent to an encoder by using a GPU, and then the image data is sent through a transmission protocol such as VIP/TCP after being encrypted and packaged. An intelligent perception module is added in the application. In an intelligent perception scenario, a synthesizer is guided, based on a network status and a target resolution determined based on the network status and the scenario, to select a proper layer for synthesis, so that transmission load can be effectively ensured, and a projection delay can be reduced.

The receive side is usually a large-screen display. Data is received, packaged, and decrypted, the data is sent to a decoder, and then the data is sent to an audio and video synchronization module for display. A super-resolution module newly added in the application is combined with the existing audio and video synchronization module to periodically perform super-resolution through audio and video synchronization, to further improve display image quality before sending for display.

Figure 3:
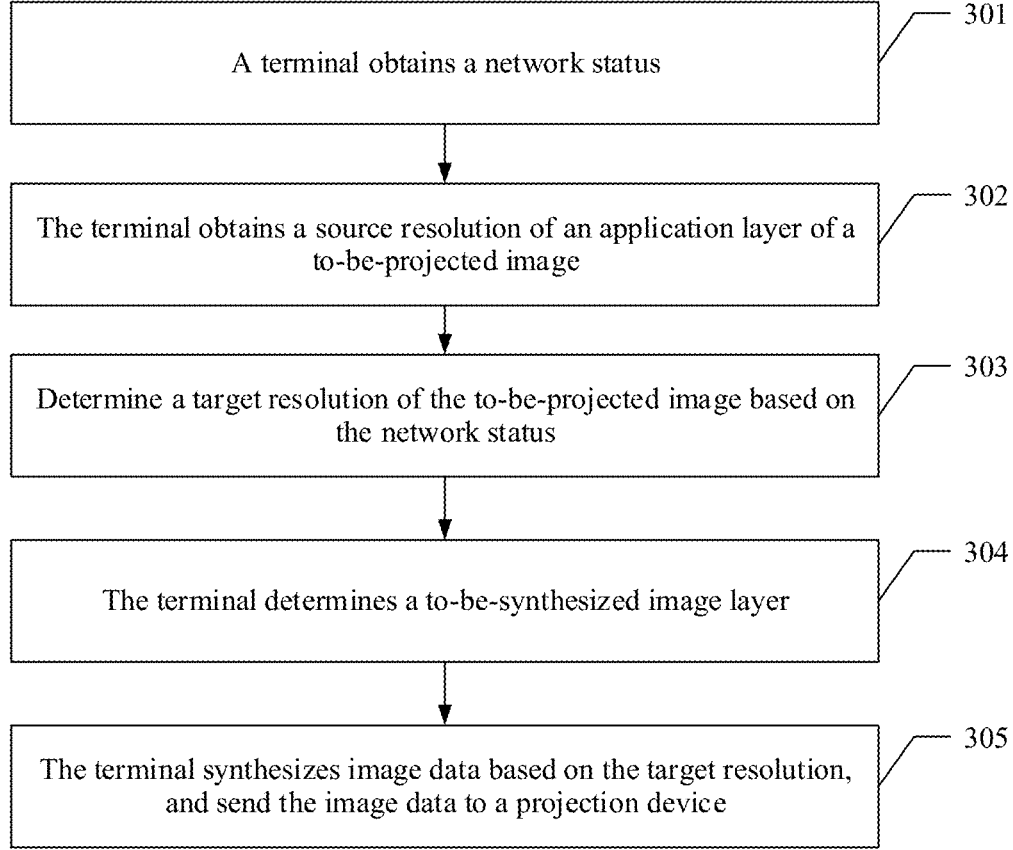
FIG. 3 is a schematic diagram of an embodiment of a projection data processing method at a projection transmit end according to an embodiment of the application.

The following describes a projection data processing method for the projection transmit end in an embodiment of the application with reference to FIG. 3.

301: A terminal obtains a network status.

The terminal obtains a real-time network status, where the network status information indicates quality of a communication link between the terminal and a projection device.

In an embodiment, a status of a current Wi-Fi connection is obtained in real time by using a Wi-Fi manager. In other words, a received signal strength indicator (RSSI) of the current connection is obtained, to obtain a signal strength dependence getRssi interface. When the network is connected, a value of the RSSI is an integer ranging from 0 to 100. When the network is disconnected, the value of the RSSI is −200.

302: The terminal obtains a source resolution of an application layer of a to-be-projected image.

The to-be-projected image is an image that is to be sent by the terminal to the projection device through wireless projection, and the terminal may obtain a source resolution of an application layer of an image currently to be displayed by a system.

In an embodiment, the terminal obtains the source resolution of the application layer of the current to-be-projected image by using a system service (SurfaceFlinger). Generally, the terminal synthesizes a system layer and the application layer by using the SurfaceFlinger to obtain the to-be-displayed image. In an embodiment of the application, the terminal may obtain layer information of each layer in the image by using the SurfaceFlinger. The layer information includes a layer name, a source resolution of a layer, and a resolution of a target display area. The following describes the layer information in detail.

(a) Layer name: identifies an owner of a layer. Generally, there are two types of layers. One is a system layer, which usually includes a layer corresponding to a status bar or a layer corresponding to a navigation bar. The other is an application layer, which is a layer displayed by an application (App). Generally, the layer name also includes an App package name.

(b) Source resolution of a layer: refers to a real resolution of a layer. Generally, a resolution of a system layer is consistent with a screen resolution, and a source resolution of an application layer may be adjusted or set according to an application scenario or a user instruction. For example, in a game application scenario, a game application is presented as different source resolutions based on different game configurations. For example, the terminal obtains the source resolution of the application layer, where the source resolution of the layer is less than or equal to the screen resolution. If the source resolution of the layer is represented in a form of "quantity of horizontal pixels×quantity of vertical pixels", a pixel aspect ratio of the layer may be further obtained. For example, if the source resolution of the layer is 1280*720, the pixel aspect ratio of the layer is 16:9.

(c) Resolution of the target display area: refers to a resolution when a layer is finally synthesized and displayed on a screen, and is used to determine a size of a display area of the layer on the screen. To determine a position of the display area of the layer on the screen, a start point position of the display area of the layer is generally further required.

It should be noted that a sequence for performing operation 301 and operation 302 is not limited.

A synthesis policy (a to-be-synthesized layer and a synthesis resolution) is determined based on the network status and the layer information. For example, a to-be-synthesized layer is determined, and a target resolution of the to-be-synthesized layer is determined. Details are separately described below.

303: Determine a target resolution of the to-be-projected image based on the network status.

The terminal determines the target resolution of the to-be-projected image based on the network status.

In an embodiment, the target resolution is positively correlated with the quality of the communication link between the terminal and the projection device. That is, poorer quality of the communication link indicates a smaller target resolution, and better quality of the communication link indicates a larger target resolution. Generally, the target resolution is less than or equal to the source resolution of the layer.

In an embodiment, the terminal may preset a value of the target resolution, for example, 1080*2340 or 720*1560.

Based on the current network status, the terminal can properly perform downsampling on an image data of an original resolution to reduce the resolution, synthesize the image data, and then encode and transmit the image data, thereby reducing a delay.

In an embodiment, the network status information includes a received signal strength indicator RSSI. A value of the RSSI may indicate signal quality of the communication link. Better signal quality corresponds to a higher target resolution. On the contrary, poorer signal quality corresponds to a lower target resolution. The target resolution is generally less than or equal to the source resolution of the layer.

In an embodiment, if a value of the RSSI is greater than or equal to a first threshold, the terminal determines that the target resolution is a first resolution; if a value of the RSSI is less than a first threshold and is greater than or equal to a second threshold, the terminal determines that the target resolution is half of a first resolution, where the second threshold is less than the first threshold; or if the value of the RSSI is less than a second threshold, the terminal determines that the target resolution of the to-be-synthesized layer is one-third of a first resolution. The first resolution may be a preset standard resolution, for example, 1080P or 720P, may be generated in real time according to a preset rule, or may be the source resolution of the application layer. A value of the first resolution is not limited herein.

For example, if the first threshold is −50, the second threshold is −70, and the first resolution is 1080P. That is, if the value of the RSSI falls within [0, −50], it indicates that the signal quality is good, and the terminal determines that the target resolution of the to-be-projected image is 1080P; if the value of the RSSI falls within (−50, −70], it indicates that the signal quality is medium, and the terminal determines that the target resolution is 540P; or if the value of the RSSI is less than −70, it indicates that the signal quality is poor, the target resolution is 360P.

It should be noted that operation 303 is performed after operation 301, and an execution sequence between operation 303 and operation 302 and operation 304 is not limited.

304: The terminal determines the to-be-synthesized image layer.

The terminal may further determine a current usage scenario, and selectively synthesize the image data based on the usage scenario and the target resolution. The usage scenario may be classified based on content currently displayed on the terminal, for example, an application display scenario or a desktop display scenario. For example, the application display scenario may be further subdivided based on a type of the application, for example, an application that displays a dynamic picture, such as a video or a game, or an application that updates a picture slowly, such as music or a reading application. The usage scenario may also be classified based on whether the current image is displayed in full screen, including a full-screen scenario and a non-full-screen scenario. In subsequent embodiments, the full-screen scenario and the non-full-screen scenario are used as examples for description.

The terminal determines whether a current scenario is the full-screen scenario or the non-full-screen scenario, and determines different to-be-synthesized image layers for different scenarios. For the full-screen scenario, only an application layer may be synthesized. For the non-full-screen scenario, all layers of an image need to be synthesized.

There are a plurality of methods for determining, by the terminal, whether the current scenario is the full-screen scenario, which are described below by using examples.

1. Based on a Layer Source Resolution of the Application Layer

If the source resolution of the application layer is greater than or equal to a third threshold, the terminal determines that the to-be-projected image is in the full-screen scenario; or if the source resolution of the application layer is less than a third threshold, the terminal determines that the to-be-projected image is in the non-full-screen scenario.

The third threshold is a preset value, and may be obtained by collecting statistics on a common resolution of the application layer when an existing application is displayed in full screen. Because the common resolution of the application layer in the full-screen scenario is generally greater than 720P, the third threshold may be set to 720P. It should be noted that a value of the third threshold is not limited herein.

2. Based on a Pixel Aspect Ratio of the Application Layer

If the pixel aspect ratio of the application layer is the same as a pixel aspect ratio of a screen, the terminal determines that the to-be-projected image is in the full-screen scenario; or if the pixel aspect ratio of the application layer is different from a pixel aspect ratio of a screen, the terminal determines that the to-be-projected image is in the non-full-screen scenario.

3. Based on a Layer Source Resolution and a Pixel Aspect Ratio of the Application Layer If the source resolution of the application layer is greater than or equal to a third threshold, and the pixel aspect ratio of the application layer is the same as a pixel aspect ratio of a screen, the terminal determines that the to-be-projected image is in the full-screen scenario.

If the source resolution of the application layer is less than a third threshold, or the pixel aspect ratio of the application layer is different from a pixel aspect ratio of a screen, the terminal determines that the to-be-projected image is in the non-full-screen scenario.

4. Based on a Layer Source Resolution and a Pixel Aspect Ratio of the Application Layer, and a Layer Name If the source resolution of the application layer is greater than or equal to a third threshold, the pixel aspect ratio of the application layer is the same as a pixel aspect ratio of a screen, and a preset layer identifier set includes an identifier of the application layer, the terminal determines that the to-be-projected image is in the full-screen scenario.

If the source resolution of the application layer is less than a third threshold, the pixel aspect ratio of the application layer is different from a pixel aspect ratio of a screen, or a preset layer identifier set does not include an identifier of the application layer, the terminal determines that the to-be-projected image is in the non-full-screen scenario.

Layer information of the application layer includes the layer source resolution of the application layer, the pixel aspect ratio of the application layer, and the layer name.

It should be noted that operation 304 is performed after operation 302, and an execution sequence between operation 304 and operation 301 and operation 303 is not limited.

305: The terminal synthesizes image data based on the target resolution, and send the image data to the projection device.

The terminal synthesizes the image data based on the target resolution, performs operations such as encoding and compression, and sends the image data to the projection device by using a wireless network. The image data is used by the projection device to display the to-be-projected image.

In an embodiment, the terminal may further perform synthesis on the to-be-projected image by reducing a frame rate, and then encode and send the to-be-projected image. The frame rate control method belongs to the conventional technology, and details are not described herein again. For example, an original frame rate of the to-be-projected image is 60 frames per second (FPS), and after the frame rate is reduced, a frame rate of the to-be-projected image is 30 FPS. Reducing the frame rate can further reduce an amount of to-be-sent data and reduce a projection delay.

According to the projection data processing method provided in the application, the terminal, that is, the projection transmit end determines the to-be-synthesized image layer and the target resolution in the image data based on the layer information and the network status information. In the full-screen scenario, a quantity of sent layers is reduced, and a resolution is reduced when the quality of the communication link is poor, to reduce an amount of image data sent during wireless projection, thereby avoiding a video image delay during projection and improving user experience.

Figure 4A:
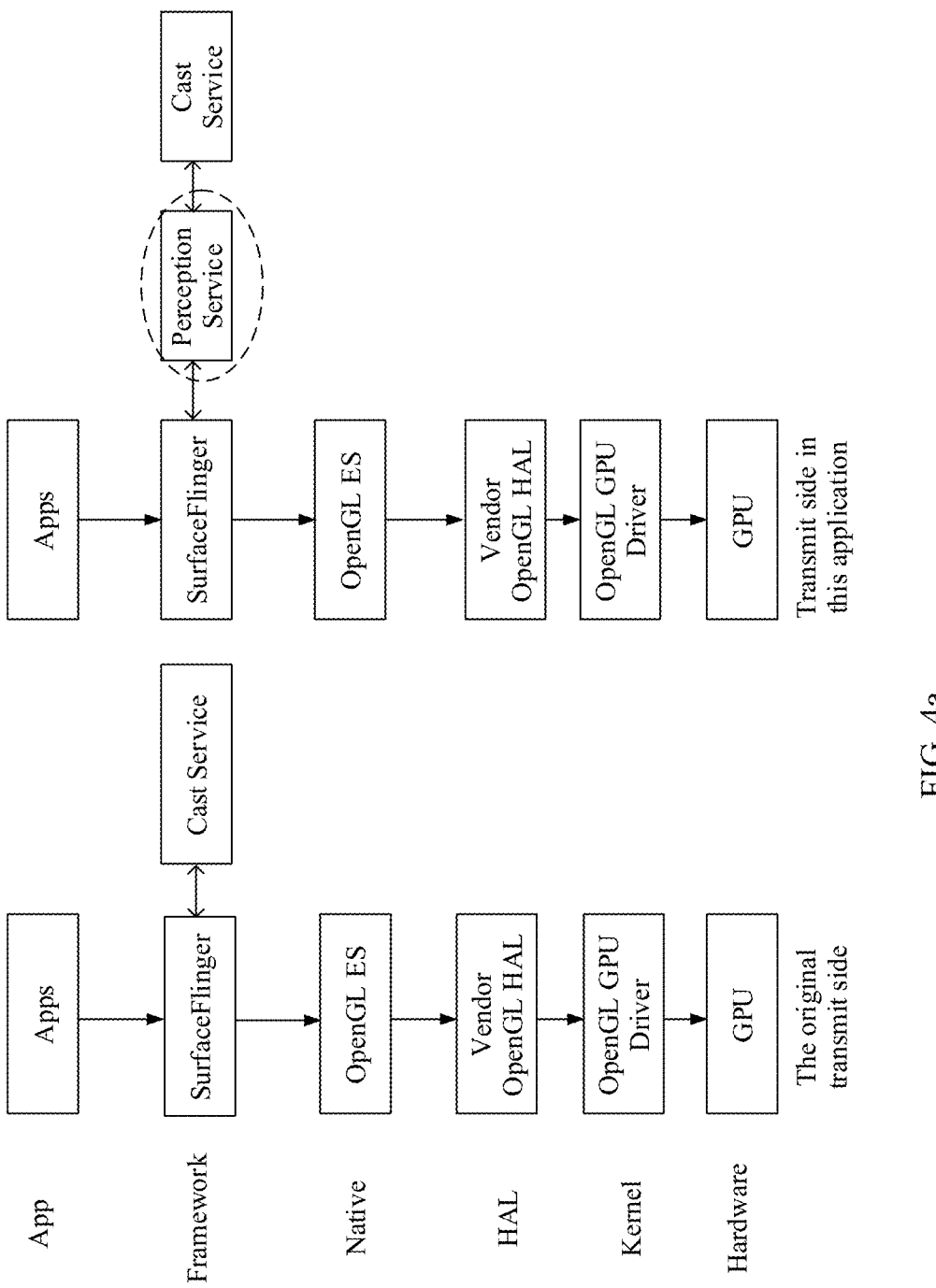
FIG. 4*a* is a hierarchical framework diagram of a graphics software system of a terminal according to an embodiment of the application.

The following describes a system for implementing the projection data processing method in an embodiments of the application. In an embodiment, a product implementation status is program code deployed in a graphics software system of the terminal. FIG. 4a shows a hierarchical framework diagram of the graphics software system of the terminal.

The top layer is an App layer, that is, an application layer. Each App layer has its own display layer to present its own display content. As a graphics layer synthesizer on an Android intelligent terminal system, the SurfaceFlinger at the Framework layer synthesizes a layer of each App and a system layer. In one aspect, the synthesized image is sent for display. In another aspect, when a projection service exists, the SurfaceFlinger invokes an API of an Open GL ES system library at the Native layer to perform GPU synthesis and transfers the synthesized data to the projection service (Cast Server). In the projection process, an output of the synthesizer can be encoded and packaged by the encoder and then sent to a peer end for display.

The perception module newly added to the transmit end in the application may provide a perception service. Information about each layer of a current to-be-displayed image is obtained through the SurfaceFlinger, a current scenario is determined, a layer finally synthesized by the SurfaceFlinger and a resolution after synthesis are guided, and then the information is sent to the projection service.

Figure 4B:
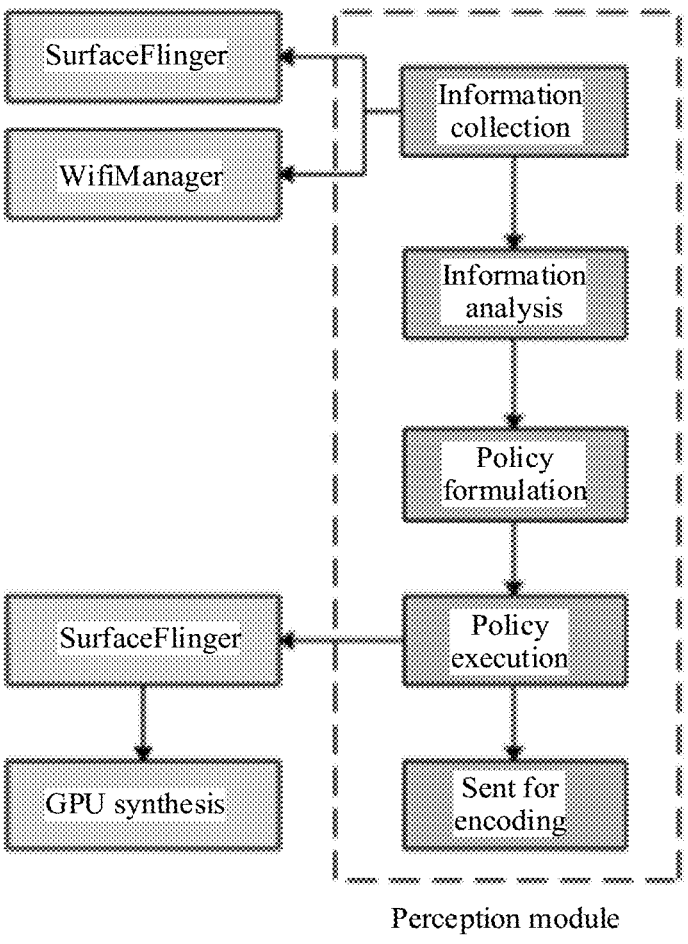
FIG. 4*b* is a schematic diagram of a key procedure of a perception module according to an embodiment of the application.

The following describes a key procedure of the perception module with reference to FIG. 4b.

The key procedure of the perception module is as follows:

1. Information collection: Information about all layers of the current frame on the SurfaceFlinger side is obtained, where the information mainly includes an application name of the layer and a source resolution of the layer. In addition, a network signal status of a current Wi-Fi connection is obtained by using a Wi-Fi manager service.

2. Information analysis: Whether an actual scenario of the currently displayed image is the full-screen scenario is inferred, based on the layer information collected in operation 1, by using an application name corresponding to the layer, the source resolution of the application layer, the pixel aspect ratio of the application layer, and the like. In addition, based on a network signal status, for example, the network status may be classified into three states: poor, medium, and good.

3. Policy formulation: A policy is formulated based on the predicted scenario, and includes the following.

3.1 For the full-screen scenario such as a full-screen game scenario or a full-screen video playback scenario, only an application layer is synthesized, and a resolution of a synthesized frame is determined based on the network status. When the network status is good, synthesis and encoding are performed based on the source resolution of the application layer or a preset first resolution. When the network status is medium, synthesis and encoding are performed after ½ sampling is performed on the source resolution of the current application layer or the preset first resolution. When the network status is poor, synthesis and encoding are performed after ⅓ downsampling is performed on the source resolution of the current application layer or the preset first resolution.

3.2 For the non-full-screen scenario such as a desktop scenario, all application layers are synthesized and the policy is adjusted based on the network status. For details, refer to operation 3.1.

4. Policy execution: Based on the corresponding policy formulated based on the scenario in operation 3, a layer that is actually synthesized by the SurfaceFlinger and a final frame resolution after synthesis are updated, and encoding and transmission are performed to reduce an actual link load.

Through scenario perception, the perception module obtains the actual application scenario and current network status of the user, collects and analyzes information about the currently synthesized layer, executes corresponding policies based on the scenario and network status, and dynamically adjusts content of the synthesized layer and a resolution of the finally synthesized video frame. In this way, the synthesized resolution is changed to reduce encoding and data transmission, reduce the load, and reduce the delay.

The foregoing describes the projection data processing method of the projection transmit end. The following describes the projection data processing method of the projection receive end. The projection receive end belongs to the terminal. For ease of description, the projection receive end is distinguished from the projection transmit end. In an embodiment of the application, the terminal of the projection receive end is referred to as the projection device. A device form of the projection device is not limited.

Figure 5A:
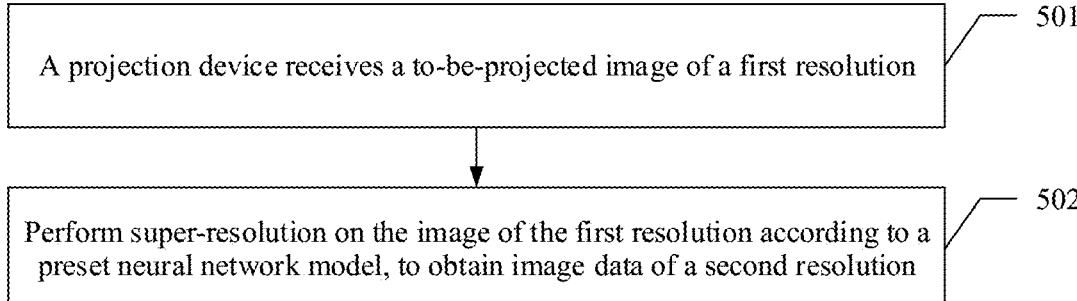
FIG. 5*a* is a schematic diagram of an embodiment of a projection data processing method at a projection receive end according to an embodiment of the application.

The following describes a projection data processing method for the projection receive end in an embodiment of the application with reference to FIG. 5a.

501: The projection device receives a to-be-projected image of a first resolution.

The projection device receives the to-be-projected image of the first resolution by using a wireless network. In an embodiment, the to-be-projected image of the first resolution is the image data that is synthesized at the target resolution and that is sent by the terminal in the embodiment corresponding to FIG. 3.

Generally, a resolution of an image supported by the projection device is high, but the first resolution of the received image data is low. In a conventional manner of linearly stretching the first resolution to the resolution supported by the projection device for display, a displayed image is blurred, image quality is poor, and user experience is affected.

In an embodiment, for video-type dynamic image data, if a frame rate of the to-be-projected image received by the projection device is less than or equal to a threshold, frame interpolation is performed on the to-be-projected image. The threshold is a fourth threshold, and the fourth threshold may be, for example, 30 FPS. A process of the frame interpolation is the conventional technology, and details are not described herein again. In an embodiment, intelligent frame interpolation is performed on the to-be-projected image. For example, if a frame rate of the obtained to-be-projected image is 30 FPS, the frame rate is increased to 60 FPS through the frame interpolation. Therefore, impact of sending frame rate control on user experience can be reduced.

502: Perform super-resolution on the image of the first resolution based on a preset neural network model, to obtain image data of a second resolution.

The projection device may perform super-resolution on the image data based on the neural network model, to improve a resolution of the image data. The neural network model may be any one of various existing super-resolution models. This is not limited herein. The super-resolution process is briefly described as follows:

1. Model loading: A hierarchy of the model is parsed, layers in a topology are sorted, and parameters of each layer are parsed, including a weight value of each layer, an activation function of each layer, a size of a corresponding convolution kernel, and an operation.

2. Pre-processing: An input normalization range and an output data normalization range are set based on a model requirement. For example, for a super-resolution model input, Y channel data in a YUV color gamut of a picture is used as the input, and the data is normalized to a range of 0 to 0.1 or −0.1 to 0.1.

Figure 5B:
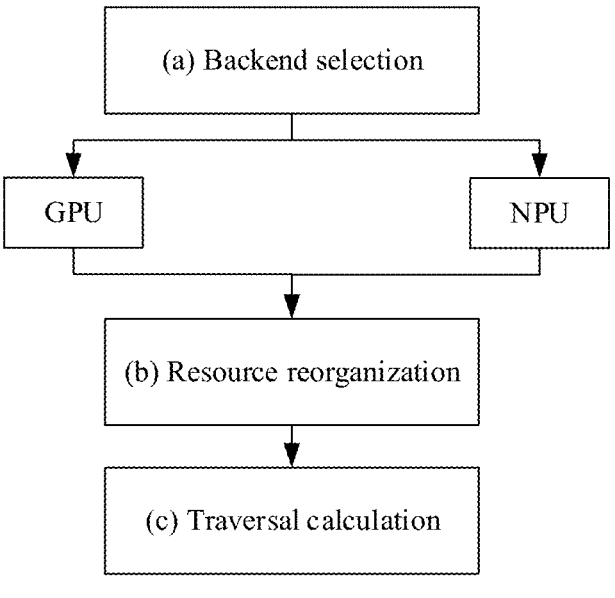
FIG. 5*b* is a schematic diagram of inference calculation of a projection device according to an embodiment of the application.

3. Inference calculation: is a process of performing model inference calculation. For details, refer to FIG. 5b. The process includes the following operations.

(a) Backend selection: An appropriate backend is selected based on a different hardware platform. The GPU is more advantageous in processing picture data, especially in reducing data I/O overheads. Therefore, the GPU is preferably selected as the backend.

(b) Resource reorganization: Resources are reorganized based on the selected backend for the loaded model. If the GPU is used as the backend, information such as parameters at each layer is sorted to generate a Fragment Shader corresponding to the current layer.

(c) Traversal calculation: In an example of the GPU backend, corresponding input and output texture IDs are bound for calculation of each layer of the model. The information is used in the Fragment shader to specify a corresponding input data source and output data storage. An Open GL instruction is invoked to execute the Fragment shader of the current layer to complete all convolution calculations corresponding to the current layer.

4. Post-processing: is a reverse process of the pre-processing, and combines an inference calculation result with original input data to form an original picture format and uses the original picture format as final data for display, that is, the image data for display.

Figure 6:
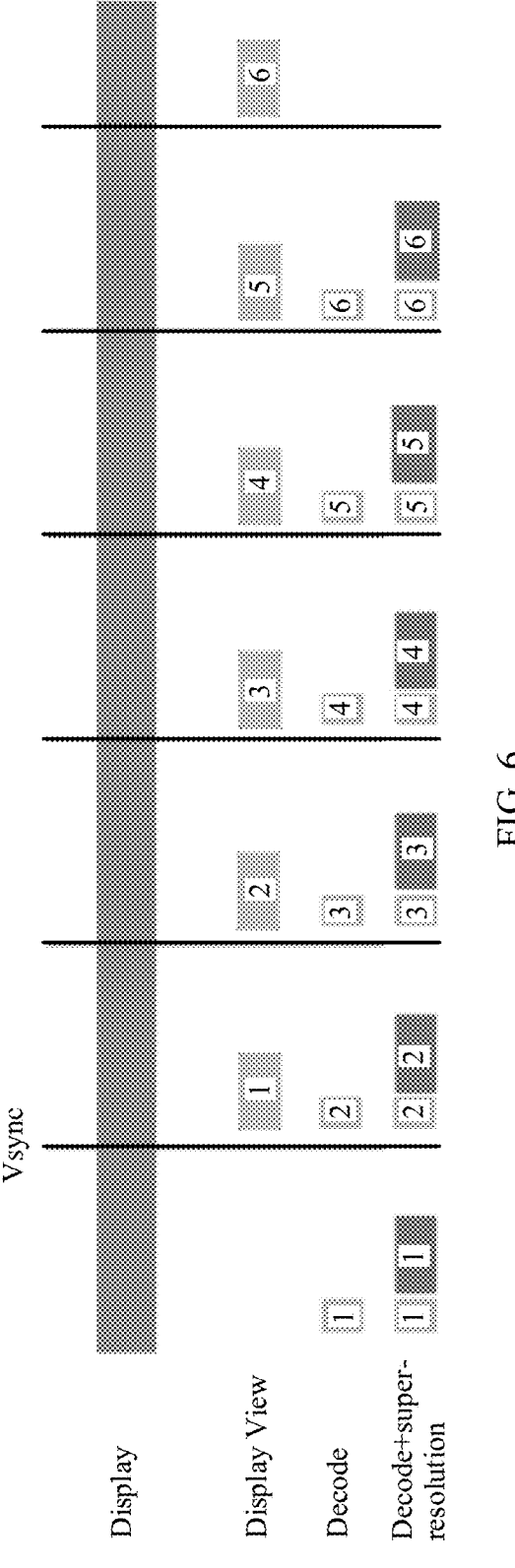
FIG. 6 is a schematic diagram of processing audio and video synchronous integration super-resolution according to an embodiment of the application.

Generally, the second resolution obtained after the super-resolution is an integer multiple of the first resolution, and a multiple is not limited. For example, the first resolution is 360P, and the second resolution obtained after the super-resolution is 720P; the first resolution is 540P, and the second resolution obtained after the super-resolution is 1080P. It should be noted that, when the GPU or NPU is used to perform AI acceleration calculation and improve display image quality, a software development kit (SDK) for the super-resolution is integrated after decoding and before sending for display. In an original audio and video synchronization operation, super-resolution is completed within a time period of sending for display without adding extra time. The following describes a process of processing audio and video synchronization integration super-resolution with reference to FIG. 6.

A Vsync signal is a trigger signal for periodic display. It is mainly used to synchronize a view drawing task at the application layer and a view synthesis task at the Native layer.

In the conventional technology, the image frame is decoded periodically according to Vsync in an audio and video synchronization phase. It can be learned from FIG. 6 that after a first frame (numbered 1 in the figure, and so on) has been decoded, the first frame is displayed in a next Vsync period. Each frame of image is decoded within a Vsync period and displayed after the Vsync period ends. In an embodiment of the application, a super-resolution module is added in the audio and video synchronization phase, and super-resolution AI inference calculation is performed by using GPU computing power of the receive end, which takes a short time. Decoding and super-resolution actions may be completed in one Vsync period, and then a result obtained after super-resolution is sent for display. In this way, image quality is further improved and user experience is enhanced without affecting a delay.

Figure 7A:
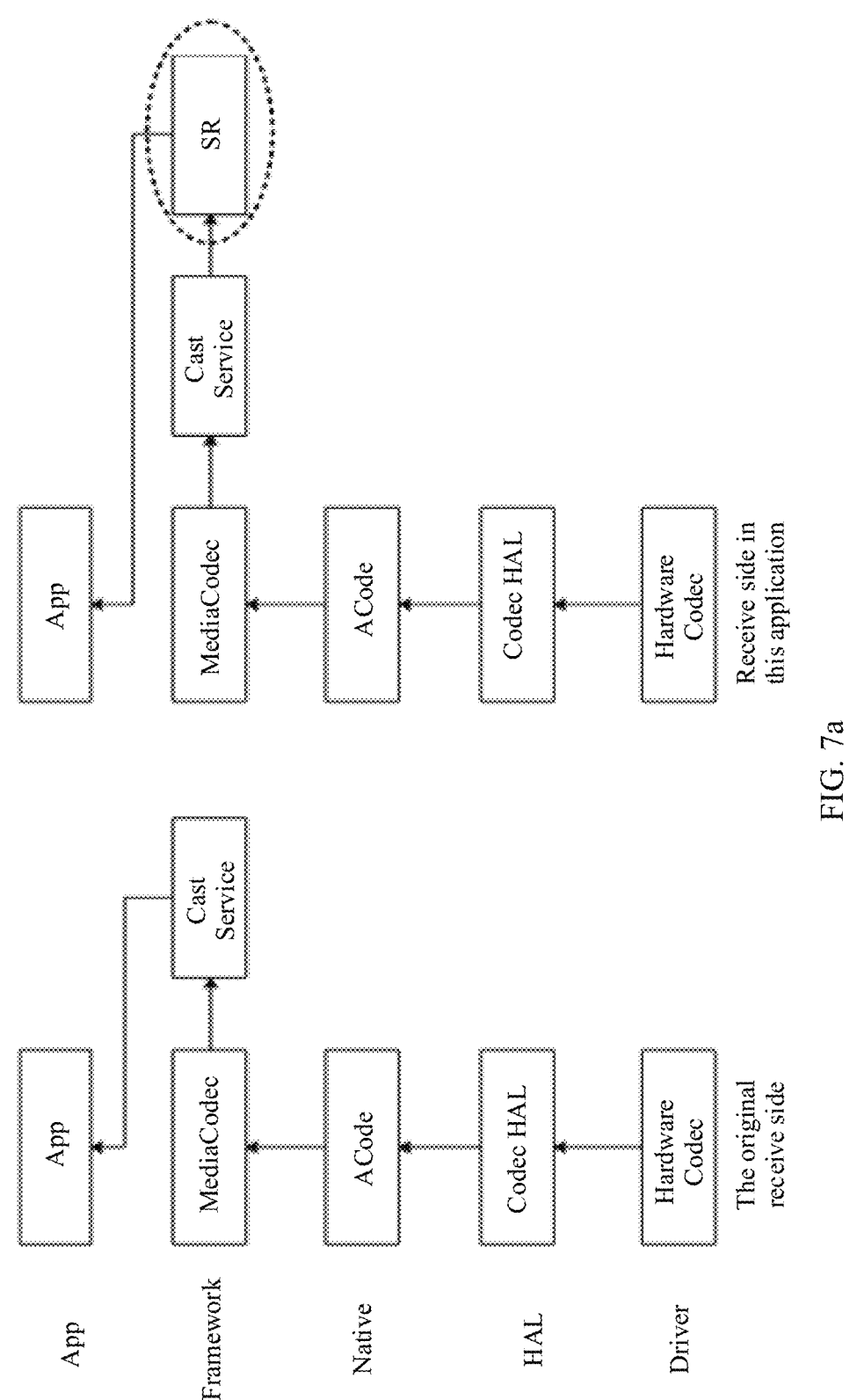
FIG. 7*a* is a hierarchical framework diagram of a graphics software system of a projection device according to an embodiment of the application.

The following describes a system that is in the receive end and that implements the projection data processing method in the embodiments of the application. In an embodiment, a product implementation status is program code deployed in a graphics software system of the terminal. FIG. 7*a* shows a hierarchical framework diagram of the graphics software system of the projection device.

For details, refer to the hierarchical framework of the graphics software system at the transmit end. The receive end integrates a super-resolution module (SR) after the projection service (Cast Service). In an existing solution, data decoded by using a hardware codec on the receive side is sent to the cast service on the receive side. However, in an embodiment of the application, after receiving the data decoded by the transmit end, the cast first sends the data to the SR module, and finally displays super-resolution data as a layer of an application on the screen.

Figure 7B:
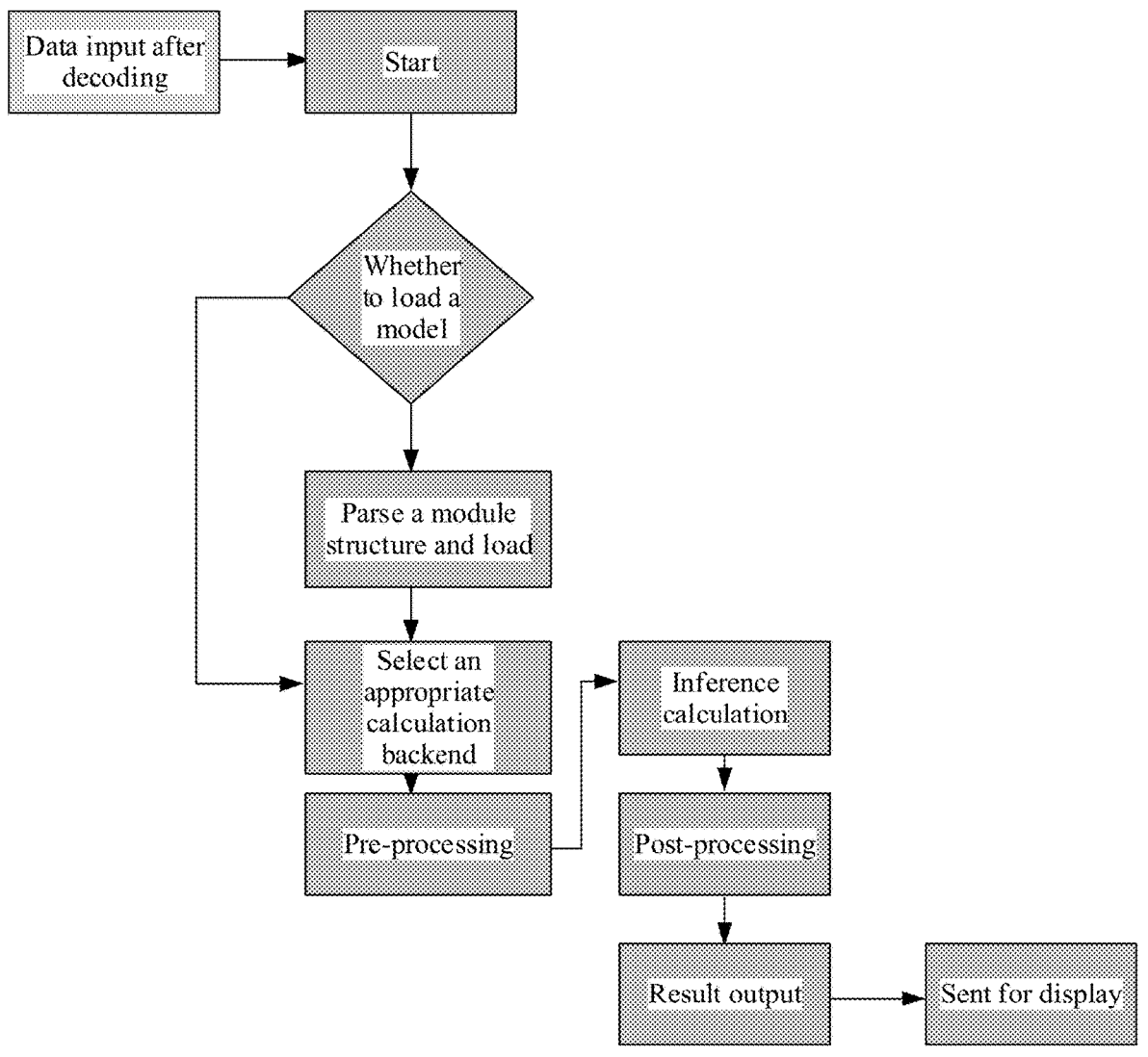
FIG. 7*b* is a schematic diagram of a key procedure of a super-resolution module according to an embodiment of the application.

The following describes a key procedure of the super-resolution module with reference to FIG. 7*b*.

The key procedure of the perception module is as follows:

1. Model loading
   (a) Check whether a model has been loaded during running; and if no model has been loaded, load a corresponding model file, parse a layer structure of a directed graph of the model, generate a corresponding structure layer for input/output, parse parameters of each layer, and generate a corresponding calculation unit. This process is initialized only once to load resources related to the structure and weight parameters to the memory.
   (b) If the model has been loaded, go to the next operation.
2. Calculation backend selection: refers to selecting an appropriate backend based on a different hardware platform. The GPU is preferably used as the backend because the GPU can use its parallel processing advantages when processing video frame data. If the NPU is used on a hardware platform, the NPU is used for some auxiliary calculation.
3. Inference calculation: Based on different calculation backends, corresponding calculation is performed in sequence based on layer nodes sorted by the directed graph of the model structure.
4. Pre-processing and post-processing: The pre-processing refers to: extracting interested information calculated by AI inference of the image frame before the super-resolution module calculation, for example, a quantity of Y-channel channels of the image; and the post-processing refers to: restoring the image data to an original RGBA data format.

The super-resolution module integrates super-resolution in the audio and video synchronization phase on the receive side, loads a corresponding super-resolution model based on the resolution, runs a corresponding inference engine, and selects a corresponding GPU or NPU for AI calculation based on backend management, thereby improving display image quality.

Figure 8:
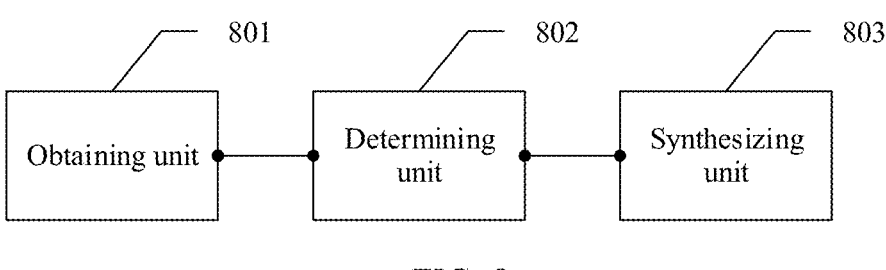
FIG. 8 is a schematic diagram of an embodiment of a projection data processing apparatus according to an embodiment of the application.

The foregoing describes the projection data processing method provided in the application. The following describes a projection data processing apparatus that implements the projection data processing method. FIG. 8 is a schematic diagram of an embodiment of a projection data processing apparatus according to an embodiment of the application.

Only one or more of the modules in FIG. 8 may be implemented by using software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

The projection data processing apparatus is a data transmit end in a wireless projection scenario, or referred to as a transmit side, that is, a terminal in the application. The terminal may be a mobile phone, a notebook computer, a tablet computer, or the like. A device form is not limited herein.

The projection data processing apparatus includes:
   an obtaining unit 801, configured to obtain network status information, where the network status information indicates quality of a communication link between a terminal and a projection device;
   a determining unit 802, configured to determine a target resolution of a to-be-projected image based on the network status information; and
   a synthesizing unit 803, configured to synthesize image data based on the target resolution, and send the image data to the projection device, where the image data is used by the projection device to display the to-be-projected image.

In an embodiment, the target resolution is positively correlated with the quality of the communication link.

In an embodiment, the network status information includes a received signal strength indicator RSSI.

In an embodiment, the determining unit 802 is configured to:
   if a value of the RSSI is greater than or equal to a first threshold, determine that the target resolution is a first resolution;
   if a value of the RSSI is less than a first threshold and is greater than or equal to a second threshold, determine that the target resolution is half of a first resolution, where the second threshold is less than the first threshold; or
   if a value of the RSSI is less than a second threshold, determine that the target resolution is one-third of a first resolution.

In an embodiment, the determining unit 802 is further configured to:
   determine a current usage scenario; and
   the synthesizing unit 803 is configured to: selectively synthesize the image data based on the usage scenario and the target resolution.

In an embodiment, the determining unit 802 is configured to: determine whether the to-be-projected image is in a full-screen scenario.

The synthesizing unit 803 is configured to: if it is determined that the to-be-projected image is in the full-screen scenario, synthesize only an application layer of all layers of the to-be-projected image based on the target resolution; or if it is determined that the to-be-projected image is in a non-full-screen scenario, synthesize a system layer of the to-be-projected image and an application layer based on the target resolution.

In an embodiment, the determining unit 802 is configured to:

if a source resolution of the application layer is greater than or equal to a third threshold, determine that the to-be-projected image is in the full-screen scenario; or if a source resolution of the application layer is less than a third threshold, determine that the to-be-projected image is in the non-full-screen scenario.

In an embodiment, the determining unit 802 is configured to:

if a pixel aspect ratio of the application layer is the same as a pixel aspect ratio of a screen, determine that the to-be-projected image is in the full-screen scenario; or if a pixel aspect ratio of the application layer is different from a pixel aspect ratio of a screen, determine that the to-be-projected image is in the non-full-screen scenario.

In an embodiment, the determining unit 802 is configured to:

if a source resolution of the application layer is greater than or equal to a third threshold, and a pixel aspect ratio of the application layer is the same as a pixel aspect ratio of a screen, determine that the to-be-projected image is in the full-screen scenario; or if a source resolution of the application layer is less than a third threshold, or a pixel aspect ratio of the application layer is different from a pixel aspect ratio of a screen, determine that the to-be-projected image is in the non-full-screen scenario.

In an embodiment, the determining unit 802 is configured to:

if a source resolution of the application layer is greater than or equal to a third threshold, a pixel aspect ratio of the application layer is the same as a pixel aspect ratio of a screen, and a preset layer identifier set includes an identifier of the application layer, determine that the to-be-projected image is in the full-screen scenario; or if a source resolution of the application layer is less than a third threshold, a pixel aspect ratio of the application layer is different from a pixel aspect ratio of a screen, or a preset layer identifier set does not include an identifier of the application layer, determine that the to-be-projected image is in the non-full-screen scenario.

In an embodiment, the synthesizing unit 803 is configured to:

synthesize the image data based on the target resolution and a first frame rate, where the first frame rate is lower than a frame rate at which the to-be-projected image is displayed on the terminal.

For advantages of the projection data processing apparatus, refer to effects of the projection data processing method in the foregoing embodiment. Details are not described herein again.

Figure 9:
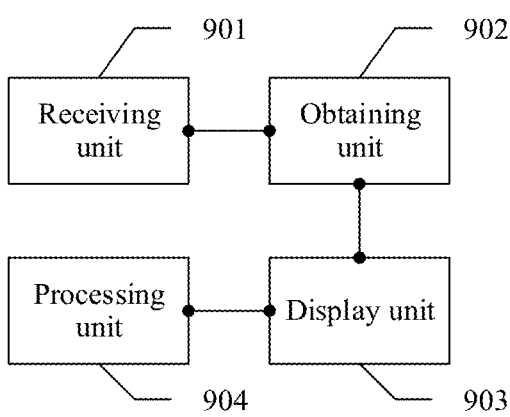
FIG. 9 is a schematic diagram of an embodiment of a projection data processing apparatus according to an embodiment of the application.

FIG. 9 is a schematic diagram of an embodiment of a projection data processing apparatus according to an embodiment of the application.

Only one or more of the modules in FIG. 9 may be implemented by using software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

The projection data processing apparatus is a data receive end in a wireless projection scenario, or referred to as a receive side, and is referred to as a projection device in the application. The projection device has an image display function, and may be a computer, a smart television, a smart screen, or the like. A device form is not limited.

The projection data processing apparatus includes:

a receiving unit 901, configured to receive a to-be-projected image of a first resolution;

an obtaining unit 902, configured to perform super-resolution on the to-be-projected image of the first resolution based on a preset neural network model by using a graphics processing unit GPU, to obtain an image of a second resolution; and a display unit 903, configured to display the image of the second resolution.

In an embodiment, the to-be-projected image includes a first image frame; and the obtaining unit 902 is configured to:

perform decoding and super-resolution on the first image frame in one audio and video synchronization period, to obtain decoded image data of the second resolution.

In an embodiment, the apparatus further includes:

a processing unit 904, configured to: if a first frame rate of the to-be-projected image is less than a fourth threshold, perform frame interpolation on the to-be-projected image to obtain a to-be-projected image of a second frame rate.

In an embodiment, the to-be-projected image of the first resolution includes the synthesized image data described in the foregoing embodiment.

Figure 10:
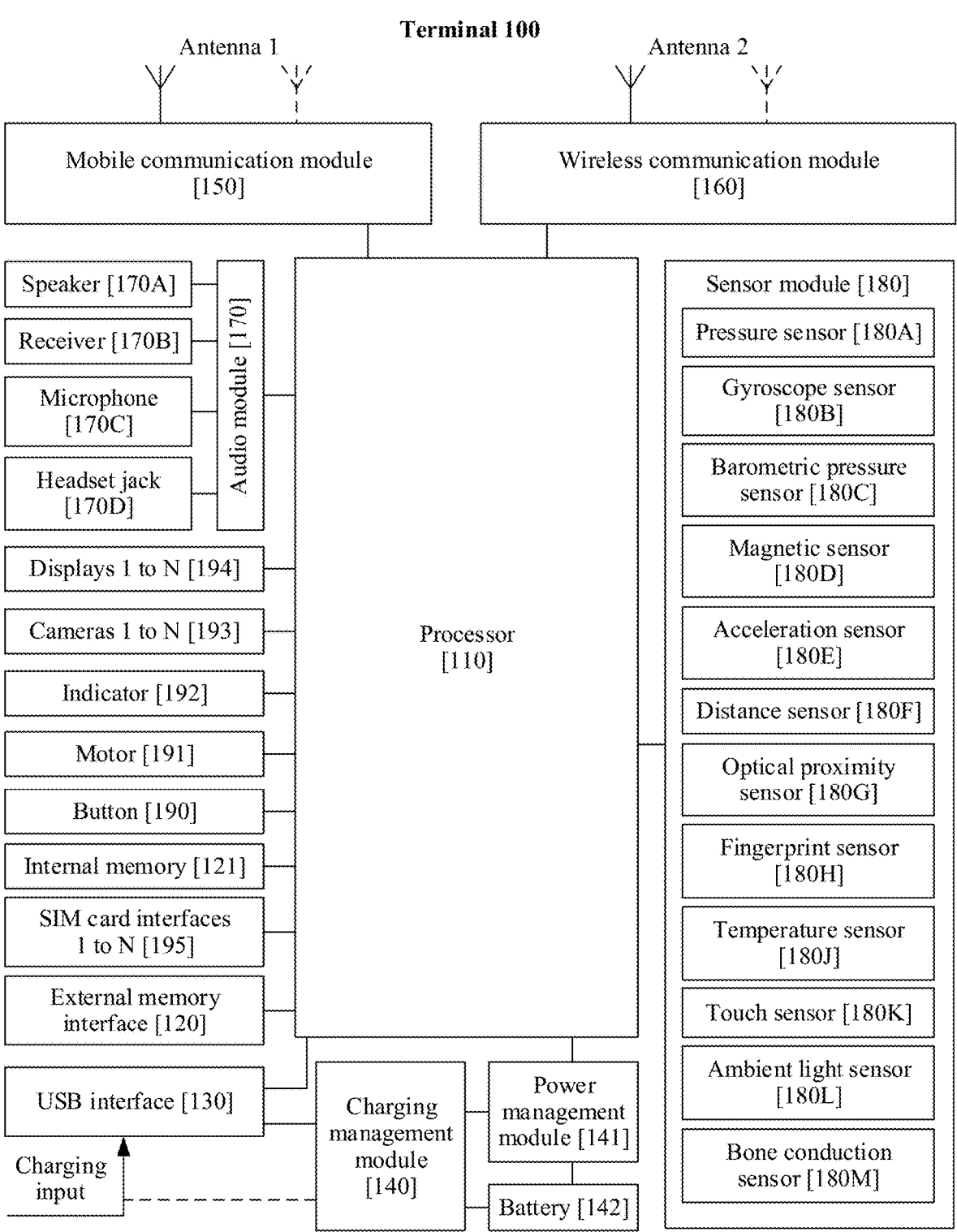
FIG. 10 is a schematic diagram of an embodiment of a terminal according to an embodiment of the application.

FIG. 10 is a schematic diagram of an embodiment of a terminal according to an embodiment of the application.

For ease of understanding, the following describes, by using an example, a structure of a terminal 100 provided in an embodiment of the application. FIG. 10 is a schematic diagram of a structure of a terminal according to an embodiment of the application.

As shown in FIG. 10, the terminal 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in an embodiment of the application does not constitute a limitation on the terminal 100. In some other embodiments of the application, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the terminal 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I1C) interface, an inter-integrated circuit sound (I1S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

It may be understood that an interface connection relationship between the modules in an embodiment of the application is merely an example for description, and does not constitute a limitation on the structure of the terminal 100. In some other embodiments of the application, the terminal 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display screen 194, the camera 193, the wireless communication module 160, and the like.

A wireless communication function of the terminal 100 may be implemented through the antenna 1, the antenna 2, the mobile communication module 150, the wireless communication module 160, the modem processor, the baseband processor, and the like.

In an embodiment, the terminal 100 may communicate with another device by using a wireless communication function. For example, the terminal 100 may communicate with a second electronic device, the terminal 100 establishes a projection connection to the second electronic device, and the terminal 100 outputs projection data to the second electronic device. The projection data output by the terminal 100 may be audio and video data.

The antenna 1 and the antenna 2 are configured to transmit and receive an electromagnetic wave signal. Each antenna in the terminal 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the terminal 100 and that includes wireless communication such as 1G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 2. In some embodiments, at least some functional modules in the mobile communication module 150 may be disposed in the processor 110. In some embodiments, at least some functional modules of the mobile communication module 150 may be disposed in a same device as at least some modules of the processor 110. The terminal may communicate with a server by using the mobile communication module.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the terminal 100, and that includes a wireless local area network (WLAN) (for example, a wireless fidelity (wireless fidelity, Wi-Fi) network), Bluetooth (BT), a global navigation satellite system (GNSS), frequency modulation (FM), a near field communication (NFC) technology, an infrared (IR) technology, and the like. The wireless communication module 160 may be one or more components integrating at least one communication processor module. The wireless communication module 160 receives an electromagnetic wave by the antenna 1, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. The terminal 100 may communicate with a projection device 200 by using a Wi-Fi network.

In some embodiments, the antenna 1 of the terminal 100 is coupled to the mobile communication module 150, and the antenna 2 is coupled to the wireless communication module 160, so that the terminal 100 may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal 100 may include one or N displays 194, where N is a positive integer greater than 1. For example, the display screen 194 may display an output word to a user.

In an embodiment, the display 194 may be configured to display interfaces for output by a system of the terminal 100. For example, the terminal 100 may synchronously output to-be-projected image data.

The terminal 100 may implement an image shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element.

The photosensitive element may be a charge-coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal.

The video codec is configured to compress or decompress a digital video. The terminal 100 may support one or more video codecs. In this way, the terminal 100 may play or record videos in a plurality of encoding formats, for example, moving picture experts group (MPEG)-1, MPEG-1, MPEG-3, and MPEG-4.

The NPU is a neural-network (NN) computing processor, quickly processes input information by referring to a structure of a biological neural network, for example, by referring to a mode of transfer between human brain neurons, and may further continuously perform self-learning. Applications such as intelligent cognition of the terminal 100 may be implemented through the NPU, for example, image recognition, facial recognition, speech recognition, and text understanding The external memory interface 120 may be used to connect to an external memory card, for example, a micro SD card, to extend a storage capability of the terminal 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application required by at least one function (for example, a voice playing function or an image playing function), and the like. The data storage area may store data (for example, audio data and a phone book) and the like created when the terminal 100 is used. In addition, the internal memory 121 may include a high-speed random access memory, or may include a nonvolatile memory, for example, at least one magnetic disk storage device, a flash memory, or a universal flash storage (UFS).

The terminal 100 may implement audio functions such as music playing and recording by using the audio module 170, the speaker 170A, the receiver 170B, the microphone 170C, the headset jack 170D, the application processor, and the like. In an embodiment, the audio module 170 may be configured to play a sound corresponding to a video. For example, when the display 194 displays a video play picture, the audio module 170 outputs a video play sound.

The audio module 170 is configured to convert digital audio information into an analog audio signal for output, and is also configured to convert analog audio input into a digital audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. The gyroscope sensor 180B may be configured to determine a motion posture of the terminal 100. The barometric pressure sensor 180C is configured to measure barometric pressure.

The acceleration sensor 180E may detect magnitudes of accelerations of the terminal 100 in various directions (usually on three axes or six axes). A magnitude and a direction of gravity may be detected when the terminal 100 is still. The acceleration sensor 180E may be further configured to identify a posture of the terminal, and is applied to an application such as switching between a landscape mode and a portrait mode or a pedometer.

The distance sensor 180F is configured to measure a distance.

The ambient light sensor 180L is configured to sense ambient light brightness.

The fingerprint sensor 180H is configured to collect a fingerprint.

The temperature sensor 180J is configured to detect a temperature.

The touch sensor 180K is also referred to as a touch panel. The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal 100 at a position different from that of the display 194.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card.

Figure 11:
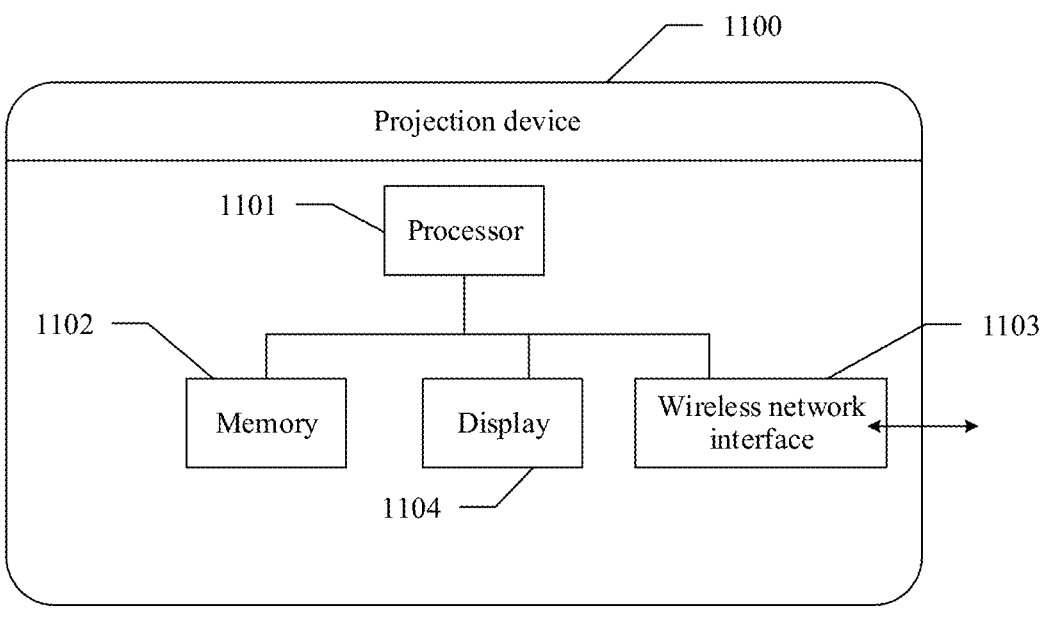
FIG. 11 is a schematic diagram of an embodiment of a projection device according to an embodiment of the application.

FIG. 11 is a schematic diagram of an embodiment of a projection device according to an embodiment of the application.

The projection device provided in the embodiment may be a computer, a television, a smart screen, or the like. A device form of the projection device is not limited in an embodiment of the application.

A projection device 1100 may perform relatively greatly because of different configurations or performance, and may include one or more processors 1101 and memories 1102. The memory 1102 stores a program or data.

The memory 1102 may be a volatile memory or a nonvolatile memory. In an embodiment, the one or more processors 1101 are one or more central processing units (CPU). The CPU may be a single-core CPU, or may be a multi-core CPU. The processor 1101 may communicate with the memory 1102 and execute a set of instructions in the memory 1102 on the projection device 1100.

The projection device 1100 further includes one or more wireless network interfaces 1103, for example, an Ethernet interface. In an embodiment, although not shown in FIG. 11, the projection device 1100 may further include a wired network interface.

The projection device 1100 further includes a display 1104, configured to display a projection picture.

In an embodiment, although not shown in FIG. 11, the projection device 1100 may further include one or more power supplies and one or more input/output interfaces. The input/output interface may be configured to connect to a display, a mouse, a keyboard, a touchscreen device, a sensor device, or the like. The input/output interface is an optional component, and may exist or may not exist. This is not limited herein.

For a procedure performed by the processor 1101 of the projection device 1100 in an embodiment, refer to the method procedure described in the foregoing method embodiments. Details are not described herein.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in the application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the operations of the methods described in embodiments of the application. The foregoing storage medium includes any medium that can store program code, for example, a USB flash drive, a removable hard disk, a read-only memory (ROM), a random access memory (RAM), a floppy disk, or a compact disc.

The foregoing embodiments are merely intended for describing the technical solutions of the application other than limiting the application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of the application.

What is claimed is:

1. A projection data processing method, comprising:

obtaining, by a terminal, network status information indicating quality of a communication link between the terminal and a projection device;

determining, by the terminal, a target resolution of an image to be projected based on the network status information; and selectively synthesizing, by the terminal, image data based on a current usage scenario and the target resolution, and sending, by the terminal, the image data to the projection device, wherein the image data is used by the projection device to display the image.

2. The method according to claim 1, wherein the target resolution is positively correlated with the quality of the communication link.

3. The method according to claim 1, wherein the network status information comprises a received signal strength indicator (RSSI).

4. The method according to claim 3, wherein the determining the target resolution of the image based on the network status information comprises:

if a value of the RSSI is greater than or equal to a first threshold, determining, by the terminal, that the target resolution is a first resolution;

if a value of the RSSI is less than a first threshold and is greater than or equal to a second threshold, determining, by the terminal, that the target resolution is half of a first resolution, wherein the second threshold is less than the first threshold; or if a value of the RSSI is less than the second threshold, determining, by the terminal, that the target resolution is one-third of a first resolution.

5. The method according to claim 1, further comprising:

determining, by the terminal, the current usage scenario.

6. The method according to claim 5, wherein the determining the current usage scenario comprises:

determining, by the terminal, whether the image is in a full-screen scenario, wherein the selectively synthesizing the image data based on the usage scenario and the target resolution comprises:

if the terminal determines that the image is in the full-screen scenario, synthesizing, by the terminal, only an application layer of all layers of the image based on the target resolution; or if the terminal determines that the image is in a non-full-screen scenario, synthesizing, by the terminal, a system layer of the image and an application layer based on the target resolution.

7. The method according to claim 6, wherein the determining whether the image is in the full-screen scenario comprises:

if a source resolution of the application layer is greater than or equal to a third threshold, determining, by the terminal, that the image is in the full-screen scenario; or if a source resolution of the application layer is less than the third threshold, determining, by the terminal, that the image is in the non-full-screen scenario.

8. The method according to claim 6, wherein the determining whether the image is in the full-screen scenario comprises:

if a pixel aspect ratio of the application layer is the same as a pixel aspect ratio of a screen, determining, by the terminal, that the image is in the full-screen scenario; or if a pixel aspect ratio of the application layer is different from a pixel aspect ratio of a screen, determining, by the terminal, that the image is in the non-full-screen scenario.

9. The method according to claim 6, wherein the determining whether the image is in the full-screen scenario comprises:

if a source resolution of the application layer is greater than or equal to a third threshold, and a pixel aspect ratio of the application layer is the same as a pixel aspect ratio of a screen, determining, by the terminal, that the image is in the full-screen scenario; or if a source resolution of the application layer is less than the third threshold, or a pixel aspect ratio of the application layer is different from a pixel aspect ratio of a screen, determining, by the terminal, that the image is in the non-full-screen scenario.

10. An apparatus for processing projection data, comprising:

a memory, and a processor coupled to the memory to store instructions, which when executed by the processor, cause the processor to perform operations, the operations comprising:

obtaining network status information indication quality of a communication link between the apparatus and a projection device;

determining a target resolution of an image to be projected based on the network status information; and selectively synthesizing image data based on a current usage scenario and the target resolution, and sending the image data to the projection device, wherein the image data is used by the projection device to display the image.

11. The apparatus according to claim 10, wherein the target resolution is positively correlated with the quality of the communication link.

12. The apparatus according to claim 10, wherein the network status information comprises a received signal strength indicator (RSSI).

13. The apparatus according to claim 12, wherein the determining the target resolution of the image based on the network status information comprises:

if a value of the RSSI is greater than or equal to a first threshold, determine that the target resolution is a first resolution;

if a value of the RSSI is less than a first threshold and is greater than or equal to a second threshold, determine that the target resolution is half of a first resolution, wherein the second threshold is less than the first threshold; or if a value of the RSSI is less than the second threshold, determine that the target resolution is one-third of a first resolution.

14. The apparatus according to claim 10, wherein the operations further comprise:

determining the current usage scenario.

15. The apparatus according to claim 14, wherein the determining the current usage scenario comprises:

determining whether the image is in a full-screen scenario, wherein the selectively synthesizing the image data based on the usage scenario and the target resolution comprises:

in response to determining that the image is in the full-screen scenario, synthesizing only an application layer of all layers of the image based on the target resolution; or in response to determining that the image is in a non-full-screen scenario, synthesizing a system layer of the image and an application layer based on the target resolution.

16. The apparatus according to claim 15, wherein the determining whether the image is in the full-screen scenario comprises:

if a source resolution of the application layer is greater than or equal to a third threshold, determining that the image is in the full-screen scenario; or if a source resolution of the application layer is less than the third threshold, determining that the image is in the non-full-screen scenario.

17. The apparatus according to claim 15, wherein the determining whether the image is in the full-screen scenario comprises:

if a pixel aspect ratio of the application layer is the same as a pixel aspect ratio of a screen, determine that the image is in the full-screen scenario; or if a pixel aspect ratio of the application layer is different from a pixel aspect ratio of a screen, determine that the image is in the non-full-screen scenario.

18. The apparatus according to claim 15, wherein the determining, whether the image is in the full-screen scenario comprises:

if a source resolution of the application layer is greater than or equal to a third threshold, and a pixel aspect ratio of the application layer is the same as a pixel aspect ratio of a screen, determining that the image is in the full-screen scenario; or if a source resolution of the application layer is less than the third threshold, or a pixel aspect ratio of the application layer is different from a pixel aspect ratio of a screen, determining that the image is in the non-full-screen scenario.

19. A non-transitory computer-readable storage medium, comprising computer-readable instructions, wherein when executed on a computer, cause the computer to perform operations of processing projection data, the operations comprising:

obtaining network status information indicating quality of a communication link between a terminal and a projection device;

determining a target resolution of an image to be projected based on the network status information; and selectively synthesizing image data based on a current usage scenario and the target resolution, and sending the image data to the projection device, wherein the image data is used by the projection device to display the image.

20. The non-transitory computer-readable storage medium of claim 19, wherein the target resolution is positively correlated with the quality of the communication link.

* * * * *